United States Patent [19]

Yamada et al.

[11] Patent Number: 5,347,614
[45] Date of Patent: Sep. 13, 1994

[54] KNOWLEDGE PROCESSING SYSTEM STRUCTURIZING TOOL

[75] Inventors: Naoyuki Yamada, Katsuta; Takayasu Kasahara, Hitachi; Yasuhiro Kobayashi, Katsuta, all of Japan

[73] Assignee: Hitachi, Ltd., Tokyo, Japan

[21] Appl. No.: 39,686

[22] Filed: Mar. 29, 1993

Related U.S. Application Data

[63] Continuation of Ser. No. 592,798, Oct. 4, 1990, abandoned.

[30] Foreign Application Priority Data

Oct. 9, 1989 [JP] Japan .................. 1-262012

[51] Int. Cl.$^5$ .................. G06F 15/18; G06F 9/44; G06F 15/40
[52] U.S. Cl. .................. 395/75; 395/76; 395/50
[58] Field of Search .................. 395/75, 76, 50; 364/191

[56] References Cited

U.S. PATENT DOCUMENTS

| | | | |
|---|---|---|---|
| 4,796,179 | 1/1989 | Lehman et al. | 364/300 |
| 4,943,932 | 7/1990 | Lark et al. | 364/513 |
| 4,965,742 | 10/1990 | Sheirik | 364/513 |
| 5,133,045 | 7/1992 | Gaither et al. | 395/51 |

FOREIGN PATENT DOCUMENTS

| | | | |
|---|---|---|---|
| 63-257827 | 10/1988 | Japan . | |
| 1121935 | 5/1989 | Japan | G06F 9/06 |

OTHER PUBLICATIONS

Gabriel, R. P., "The Common LISP Object System", from AI Expert, Mar. '89, pp. 54–65.

van Melle et al., "The EMYCIN Manual", Nov. 1981, The Stanford Univ. Report No. STAN-CS-885, pp. 1–13.

Kanamori et al., "Knowledge Representation Method and Rapid Inference Method in ES/Kernel," Hitachi Hoyouron, Mar. 1987, pp. 17–22.

Laird and Newell, "A Universal Weak Method: Summary of Results", Proceedings of the Eighth Intl. Joint Conf. on Artificial Intelligence, Aug. 1983, pp. 771–773.

Friedland et al., "The Concept and Implementation of Skeletal Plans", Stanford University, 1985, No. KSL 85-6.

(List continued on next page.)

Primary Examiner—Robert W. Downs
Attorney, Agent, or Firm—Antonelli, Terry, Stout & Kraus

[57] ABSTRACT

A knowledge processing system structurizing method and tool. By preparing a general-purpose search program on the basis of information inputted by the user, an inference program for a given problem to be solved and a given object domain is created. The general-purpose search program is constituted by a plurality of search elementary functions. A guide message is displayed on a display unit in accordance with classified information of a problem solving strategy. Program creating knowledges are obtained from the information inputted by the user in response to the guide message. By employing the program creating knowledges, a general-purpose program is created with the aid of a correspondence table containing correspondences between search elementary functions having search primitive functions built therein and search fundamental functions. The correspondence table may comprise a first correspondence table containing correspondences established between the search primitive functions and the search fundamental functions and a second correspondence table containing correspondences between search fundamental functions and the search elementary functions.

8 Claims, 45 Drawing Sheets

OTHER PUBLICATIONS

Cohen et al., The Handbook of Artificial Intelligence vol. III, Addison-Wesley Pub., 1982, pp. 515-522, 551-562.

Charniak et al., Artificial Intelligence Programming 2nd ed., Lawrence Erlbaum Assoc. Pub., 1987, pp. 248-275, 472-473.

Barr et al., The Handbook of Artificial Intelligence vol. IV, Addison-Wesley Pub., 1989, pp. 303-321.

Langley, P., "Exploring the Space of Cognitive Architectures," Behavior Research Methods & Instrumentation, 1983, 289-299.

McDermott, J., "Using Problem-Solving Methods to Impose Structure on Knowledge," Intl. Workshop on Artificial Intelligence for Indus. Appl., 1988, 7-11.

Hu, D., Programmer's Reference Guide to Expert Systems, Howard W. Sams & Co., 1987, 167-179.

Hamacher et al., Computer Organization, McGraw-Hill Book Co., 1984, 346-352.

*Proceedings of the Western Conference on Expert Systems,* "Choosing Knowledge Acquisition Strategies for Application Tasks". Jun. 4, 1987, Disneyland Hotel, Anaheim, Calif.

*Proceedings of the International Workshop on Artifical Intelligence For Industrial Applications,* "Basic Architecture of Configuration Expert Systems for Automation Engineering", May 27, 1988, Hitachi City, Japan.

*Proceedings of the International Workshop on Artifical Intelligence For Industrial Applications,* "Using Problem-Solving Methods to Impose Structure on Knowledge", May 27, 1988, Hitachi City, Japan.

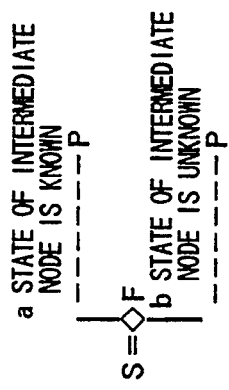
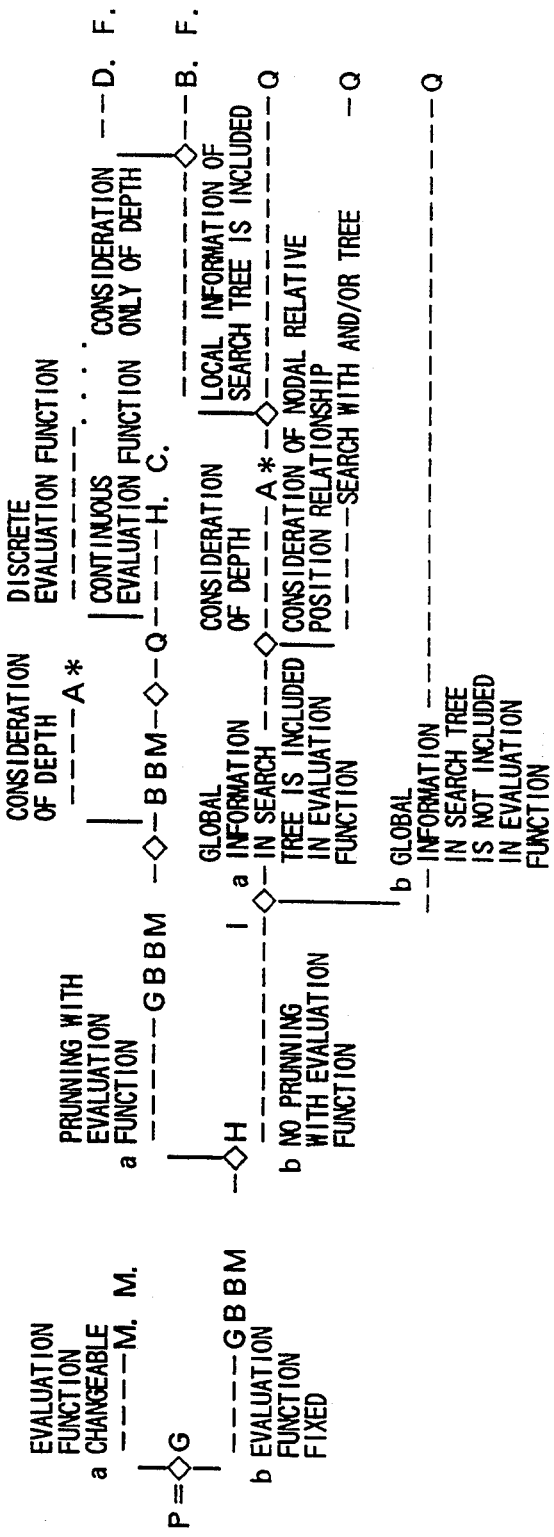
FIG. 3a
FIG. 3b

FIG. 4

SEARCH PRIMITIVE FUNCTIONS

1. PARENT(C,K):RETURN PARENT NODE OF SEARCH TREE
2. LEFT_MOST_CHILD(C,K):RETURN NODE OF ELDEST SON
3. RIGHT_SIBLING(C,K):RETURN NODE OF ELDER BROTHER
4. LABEL(C,K):RETURN NODE OF LABEL OF SEARCH TREE
5. ROOT(K):RETURN ROOT NODE OF TREE
6. CLEAR(K):CLEAR TREE
7. DEEP(C,K):RETURN DEPTH OF NODE
8. HEIGHT(C,K):RETURN HEIGHT OF NODE
9. LEFT(C,K):RETURN "1" IF C IS LEAF OF TREE AND OTHERWISE "0"
10. KILL(C,K):REMOVE NODE C FROM ACTIVE NODE
11. set_atr(obj,atr,val):SET ATTRIBUTE "art" OF OBJECT (INCLUDING NODE OF TREE) AT "val"
12. get_atr(obj,atr):RETURN VALUE OF ATTRIBUTE "atr" OF OBJECT (INCLUDING NODE OF TREE)

SEARCH FUNDAMENTAL FUNCTIONS

13. EVALUATE(C,K):RETURN EVALUATION VALUE OF NODE C
14. JUMPING(C,K):DESIGNATE DISTINATION NODE WHEN NODE C IS ESTABLISHED
15. BACK_TRACKING(C,K):DESIGNATE DISTINATION NODE UNLESS NODE C IS ESTABLISHED
16. EVAL_LINK(C,K,1):RETURN EVALUATION VALUE OF LINK 1
17. ESTABLISH(C,K):RETURN "1" IF NODE C IS ESTABLISHED AND OTHERWISE "0"
18. GOAL(C,K):WHEN NODE C IS GOAL, THEN "1"
    WHEN NODE C IS NOT GOAL, THEN "0"
19. ACTIVE_C(C,K):RETURN "1" WHEN NODE C IS ACTIVE, AND "0" UNLESS NODE C IS ACTIVE
20. SEARCH_STATE(C,K):RETURN SEARCH STATE OF NODE C
21. MAKE_LINK(C,K):RETURN LINK OF NODE C

FIG. 8

| CLASSIFIED ITEM | SELECT MENU |
|---|---|
| A | a. META-LEVEL INFORMATION OF SEARCH SPACE IS KNOWN<br>b. META-LEVEL INFORMATION OF SEARCH SPACE IS UNKNOWN |
| B | a. GOAL IS GIVEN IN TERMS OF STATE<br>b. GOAL IS GIVEN IN TERMS OF CONDITION |
| C | HOW MANY GOALS ARE TO BE DETERMINED ?<br>a. ONE GOAL IS SUFFICIENT<br>b. PLURAL GOALS → PLEASE INPUT THE NUMBER<br>c. ALL GOALS |
| D | a. SEARCH STARTING POINT IS GIVEN IN TERMS OF STATE<br>b. SEARCH STARTING POINT IS GIVEN IN TERMS OF CONDITION |
| E | a. INITIAL STATE IS SINGLE<br>b. INITIAL STATE ARE PLURAL → PLEASE INPUT THE NUMBER |
| F | OPERATOR TYPE IS GIVEN<br>a. IN TERMS OF FUNCTION (STATE OF INTERMEDIATE NODE IS UNKNOWN)<br>b. IN TERMS OF LINK (STATE OF INTERMEDIATE NODE IS KNOWN) |
| G | a. EVALUATION FUNCTION CHANGEABLE<br>b. EVALUATION FUNCTION FIXED |
| H | a. PRUNING BY EVALUATION FUNCTION<br>b. NO PRUNING BY EVALUATION FUNCTION |
| I | a. GLOBAL INFORMATION IN SEARCH TREE IS INCLUDED IN EVALUATION FUNCTION<br>b. GLOBAL INFORMATION IN SEARCH TREE IS NOT INCLUDED IN EVALUATION FUNCTION |

FIG. 9

| CLASSIFIED ITEM | | SLOT NAME | INPUT VALUE | CONVERTED VALUE |
|---|---|---|---|---|
| A | | global-inf | a | yes |
| | | | b | no |
| B | | goal-condition-type | a | state |
| | | | b | condition |
| C | | goal-number | a | 1 |
| | | | b | n |
| | | | c | all |
| D | | initial-type | a | state |
| | | | b | condition |
| E | | initial-number | a | 1 |
| | | | b-n | n |
| F | | operation-type | a | function |
| | | | b | link |
| G | | evaluation-func-type | a | fix |
| | | | b | chang |
| H | | bounding | a | yes |
| | | | b | no |
| J | 1 | parent-relation | a | deepest |
| | | | b | shallowest |
| | | | c | no |
| | 2 | sibling-relation | a | bigger |
| | | | b | smaller |
| | | | c | no |
| K | 1 | es-parent-relation | a | a |
| | | | b | b |
| | | | c | c |
| | 2 | es-sibling-relation | a | a |
| | | | b | b |
| | | | c | c |
| | | | d | d |
| | | | e | e |

FIG. 10

| FRAME NAME | SLOT NAME | DEFAULT VALUE |
|---|---|---|
| Task-spec | super-class | system |
| | global-inf | no |
| | goal-number | 1 |
| | goal-condition-type | state |
| | goal-condition-place | deepest |
| | evaluation-func-type | fix |
| | initial-type | state |
| | initial-number | 1 |
| | operation-type | link |
| | parent-relation | deepest |
| | sibling-relation | bigger |
| | bounding | no |
| | es-parent-relation | a |
| | es-sibling-relation | a |

FIG. 11

1. DEPTH OF NODES IN SEARCH TREE
    a. PREFERENCE IS PUT TO DEEP NODE
    b. PREFERENCE IS PUT TO SHALLOW NODE
    c. IRRELEVANT

2. BREADTH IN SEARCH TREE
    a. PREFERENCE IS PUT TO ELDEST SON
    b. PREFERENCE IS PUT TO YOUNGEST SON
    c. IRRELEVANT

FIG. 12

1. VALIDITY CONDITIONS CONCERNING PARENT-CHILD RELATION IN SEARCH TREE
    a. UNLESS PARENT IS VALID, CHILDREN ARE NOT VALID EITHER
    b. UNLESS ONE OF CHILDEN IS VALID, PARENT IS NOT VALID
    c. IRRELEVANT

2. VALIDITY CONDITIONS CONCERNING SIBLING IN SEARCH TREE
    a. ONLY ONE NODE IN SIBLING IS VALID
    b. PLURAL NODES IN SIBLING ARE VALID
    c. UNLESS ELDER BROTHER IS VALID, YOUNGER BROTHER IS NOT VALID
    d. UNLESS YOUNGER BROTHER IS VALID, ELDER BROTHER IS NOT VALID
    e. IRRELEVANT

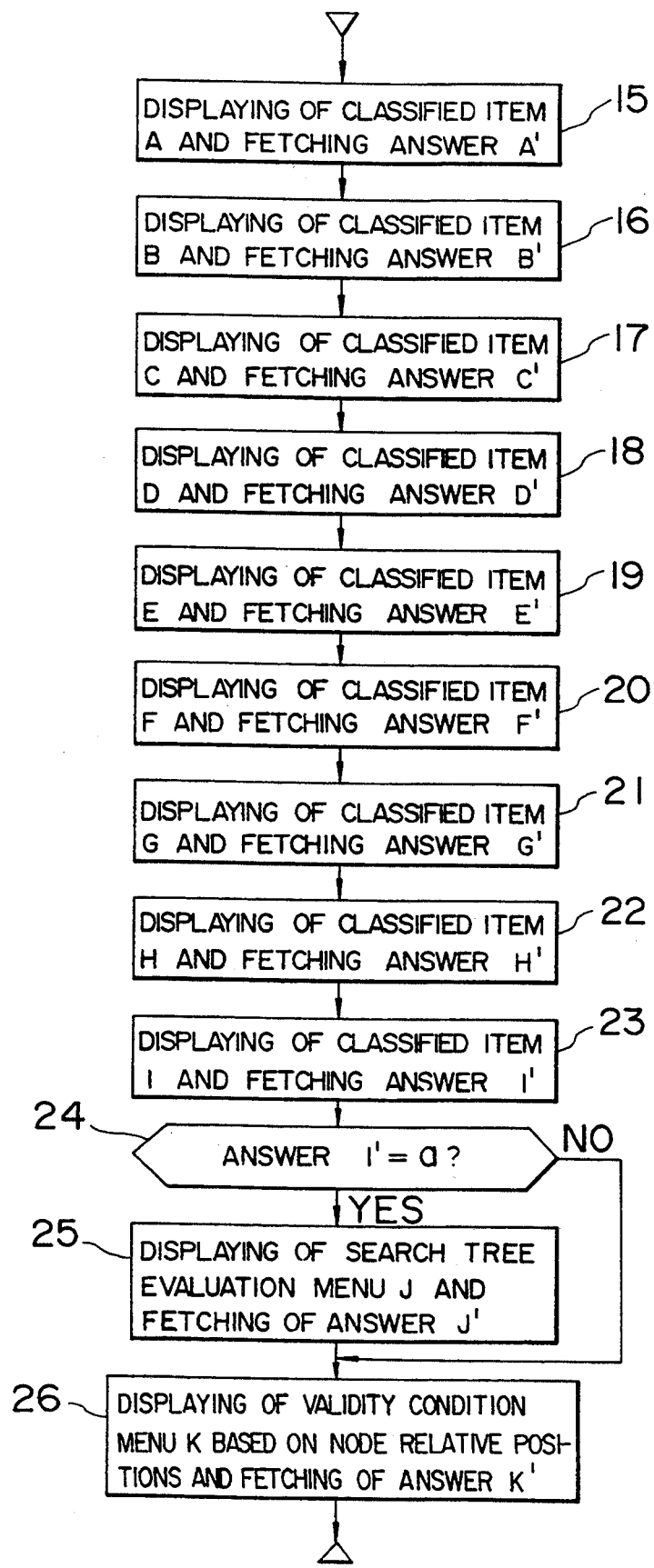

FIG. 14

| | ITEMS | CONTENTS |
|---|---|---|
| SETTING OF PROBLEM AND KNOWLEDGES ABOUT SOLUTION | GOAL FUNCTION | OVERALL WORK TIME |
| | CONSTRAINT | AT MOST FOUR WORKERS AT ANY GIVEN TIME |
| | NATURE OF SOLUTION | SATISFYING SOLUTION |
| | NUMBER OF SOLUTION | 1 |
| KNOWLEDGES OF OBJECT DOMAIN | TASK 1 | THREE WORKERS EACH FOR 4 HOURS |
| | TASK 2 | TWO WORKERS EACH FOR 2 HOURS |
| | TASK 3 | ONE WORKER FOR 1 HOURS |

FIG. 15

| |
|---|
| ANSWER A' = b |
| ANSWER B' = b |
| ANSWER C' = c |
| ANSWER D' = a |
| ANSWER E' = a |
| ANSWER F' = a |
| ANSWER G' = b |
| ANSWER H' = b |
| ANSWER I' = a |
| ANSWER J' = 1-b, 2-c |
| ANSWER K' = 1-b, 2-e |

FIG. 16

| FRAME NAME | SLOT NAME | VALUE |
|---|---|---|
| Task-spec | super-class | system |
| | global-inf | no |
| | goal-number | 1 |
| | goal-condition-type | condition |
| | goal-condition-place | deepest |
| | evaluation-func-type | fix |
| | initial-type | state |
| | initial-number | 1 |
| | operation-type | function |
| | parent-relation | shallowest |
| | sibling-relation | no |
| | bounding | no |
| | es-parent-relation | b |
| | es-sibling-relation | e |

FIG. 19

```
check_goal_cond1
  int num, i;
  char *place;
  char *active[100], *goal[100];
  int ac_num, gc_num;
  send("task_spec", "ask", "goal_number", &num);
  send("task_spec", "ask", "goal_condition_place", &place);
  send("control", "ask_set_array", "goal_c", &gc_num, goal);
  send("control", "ask_set_array", "active_c", &ac_num, active);
  if(strncmp(place, "shallowest", 10)==0 &&
     gc_num == num){
    send("control", "assign", "finishing_cond", "yes");
    send("system", "print", "¥n goal ----%s---- ¥n", goal[i]);
    return;
  }
  if(strncmp(place, "deepest", 7)==0 &&
     ac_num == 0) {
    if(gc_num >= num) {
      send("control", "assign", "finishing_cond", "yes");
      send("system", "print", "¥n goal ----%s---- ¥n", goal[i]);
      return;
    }
    for(i=0; i => num-1; i++){
      send("system", "print", "¥n goal ----%s---- ¥n", i, goal[i]);
    }
    if(gc_num =< num) {
      send("task_spec", "assign", "finishing_cond", "yes");
      send("system", "print", "¥n goal ----%s---- ¥n", goal[i]);
    }
    for(i=0; i => num-1; i++){
      send("control", "ask", "goal_number", &num);
      send("system", "print", "¥n goal ----%s---- ¥n", i, goal[i]);
      send("system", "print", "¥n goal is not found", num);
      return;
    }
  }
```

F I G. 24

| FRAME NAME | SLOT OF task-spec frame AND VALUE THEREOF | RELEVANT PROGRAM ELEMENT |
|---|---|---|
| PROGRAM ELEMENT $A_1$ | parent-relation =deepest | (CGC1)<br>char *A [50], *G [50]<br>int n, goal-number<br>na_ele, ng_ele |
| | parent-relation =shallowest | (CGC2)<br>char *A [1], *G [1]<br>int n, goal-number<br>na_ele, ng_ele |
| | parent-relation =no | (CGC3)<br>char *A [50], *G [50]<br>int n, goal-number<br>na_ele, ng_ele |
| PROGRAM ELEMENT $A_4$ | parent-relation =deepest | (CGC4)<br>if (na_ele=0 &&<br>ng_ele≧goal-number) |
| | parent-relation =shallowest | (CGC5)<br>if (ng_ele<br>≧goal-number) |
| | parent-relation =no | (CGC6)<br>if (ng_ele<br>≧goal-number) |

FIG. 25

```
check_goal_cond1
    int num, i;
    char *place;
    char *active[100], *goal[100];
    int ac_num, gc_num;
    send("control", "ask_set_array", "goal_c", &gc_num, goal);
    send("control", "ask_set_array", "active_c", &ac_num, active);
    if(strncmp(place, "shallowest", 10) == 0 &&
       gc_num >= num) {
        send("control", "assign", "finishing_cond", "yes");
        send()"system", "printf", "goal num=%s----", i, goal[i]);
    for(i=0; i <= num-1; i++) {
        send("system", "puts", goal[i]);
    }
    return;}
```

FIG. 26

| FRAME NAME | SLOT OF task-spec frame AND VALUE THEREOF | | RELEVANT PROGRAM ELEMENT |
|---|---|---|---|
| PROGRAM ELEMENT $D_{10}$ | es-parent -relation = a | es-sibling -relation = a | (SL1) IF ONE NODE OF SIBILING HAS ALREDY BEEN ESTABLISHED, ALL SLOTS "history" OF OPERATOR ARE SET Used. |
| | | es-sibling -relation = b | (SL2) IF N NODES OF SIBILING HAVE ALREDY BEEN ESTABLISHED, ALL SLOTS "history" ARE SET Used. |
| | | es-sibling -relation = c | (SL3) NOTHING IS DONE |
| | | es-sibling -relation = d | (SL4) NOTHING IS DONE |
| | | es-sibling -relation = e | (SL5) NOTHING IS DONE |
| | es-parent -relation = b | | |

FIG. 30a

```
f_Move_Task2( )
{
    char   *analyzer, *node, *state;
    int    start, end, st, ed, par1, par2, par3, par4;
    int    dif;
    send("control", "ask", "trans_node", &node);
    send(node, "ask", "state", "&state);
    send(state, "ask", "analyzer", "&analyzer);
    send(analyzer, "ask", "par1", &par1);
    send(analyzer, "ask", "par2", &par2);
    send(analyzer, "ask", "par3", &par3);
    send(analyzer, "ask", "par4", &par4);
    start_End_Time("Task1", state, &start, &end);
    if (par1 >= par3)  st = par3;
    if (par2 <= par4)  st = par4;
    dif = end - start;
    move_task("Task2", node, st, dif);
}
```

FIG. 30b

```
f_Move_Task3( )
{
    char   *analyzer, *node, *state;
    int    start, end, st, ed, par1, par2, par3, par4;
    int    dif;
    send("control", "ask", "trans_node", &node);
    send(node, "ask", "state", "&state);
    send(state, "ask", "analyzer", "&analyzer);
    send(analyzer, "ask", "par1", &par1);
    send(analyzer, "ask", "par2", &par2);
    send(analyzer, "ask", "par3", &par3);
    send(analyzer, "ask", "par4", &par4);
    start_End_Time("Task3", state, &start, &end);
    if (par1 >= par3)  st = par3;
    if (par2 <= par4)  st = par4;
    dif = end - start;
    move_task("Task3", node, st, dif);
}
```

FIG. 32

| |
|---|
| ANSWER A' = b |
| ANSWER B' = b |
| ANSWER C' = a |
| ANSWER D' = a |
| ANSWER E' = a |
| ANSWER F' = b |
| ANSWER G' = b |
| ANSWER H' = b |
| ANSWER I' = a |
| ANSWER J' = 1-a, 2-c |
| ANSWER K' = 1-a, 2-a |

FIG. 34

```
check_goat_cond 1{
    int num, i, ks, st_num;
    char *place, *st_n;
    char *active[100], *goal[100], *charc[100];
    int ac_num, gc_num;
    send("task_spec", "ask", "goal_number", &num);
    send("control", "ask_set_array", "gola_c", &gc_num, goal);
    send("control", "ask_set_array", "active_c", &as_num, active);
    if(ac_num==0 && gc_num>=num) {
        send("control", "assign", "finishing_cond", "yes");
        for(i=0;i<=num-1;i++) {
            send("system", "print", "%s", goal[i]);}
        goal----;
        return;}
    if(gc_num < num) {
        send("task_spec", "enough_number_of_goal is not found");
        send("system", "print", "Required goal number %d", num);
        send("system", "print", "Exist goal number %d", gc_num);
        for(i=0;i<=num-1;i++) {
            send("system", "print", "%d", gola(i));}
        goal----;
        return;};
        (unter
```

FIG. 41

OUTLINE PROGRAM

EVALUATE (C, K)

Struct node C ; tree k ;
{
    return (User-eval (C, K)

| E 1 |
|---|

| E 2 |
|---|

) }

INSERTION PROGRAM

| CLASSIFIED ITEM | VALIDITY CONDITION ||||||||||||| CORRESPONDING STATEMENT | INSERT PLACE |
|---|---|---|---|---|---|---|---|---|---|---|---|---|---|---|
| | A | B | C | D | E | F | G | H | I | J-1 | J-2 | K-1 | K-2 | | |
| | - | - | - | - | - | - | - | - | a | a | - | - | - | deep | T3 |
| | - | - | - | - | - | - | - | - | a | b | - | - | - | -deep | T3 |
| | - | - | - | - | - | - | - | - | b | - | - | - | - | no | T3 |
| | - | - | - | - | - | - | - | - | a | - | a | - | - | label | T4 |
| | - | - | - | - | - | - | - | - | - | - | b | - | - | -label | T4 |
| | - | - | - | - | - | - | - | - | b | - | - | - | - | no | T4 |

VALUES IN TASK-SPEC FRAME

FIG. 43

```
EVALUATE (c, k)

struct node C ; deep k ;
{
   return (user-eval (c, k)
         + deep (c, k))};
```

FIG. 45

```
OUTLINE PROGRAM
  Reset_active_node ( ) {
    struct node C (node_num) ; int i;
    active_c (C) ;
    for (i=0, i≤ node_num; i++) {
      if (C [i] ==null) return;
        R1
        R2          } ;}

INSERTION PROGRAM
  R1: if (T1 c [i] ==0) return;
  R2:   for (j=0; j< node_num; j++) {
          if (T2 (C [i]) < T2 (C [j])
            &&(evaluate(C[i])<evaluate(C[j]))) Kill(c,k); }
```

FIG. 46

| CLASSIFIED ITEM | VALIDITY CONDITION ||||||||  CORRESPONDING STATEMENT | INSERT PLACE |
|---|---|---|---|---|---|---|---|---|---|---|
| | A | B | C | D | E | F | G | H | | |
| VALUES IN TASK-SPEC FRAME | | | | | | | | | MAKE-LINK | T1 |
| | | | all of | – | – | – | – | – | NO | T1 |
| | | | | | | | | yes | deep | T2 |
| | | | | | | | | no | deep | T2 |
| | | | | | | | | | | T2 |

FIG. 47

```
Reset-active-node ( ) {
   Struct node C [Node-Num] ;int i;
   ACTIVE-C (C) ;
   for (i-0; i≦Nocle-Num; i++) {
    if (C [i] ==NULL) return;
    for (j=0, j<node-num; j++) {
    if (MAKE-LINK (C [i]) ==0) return;
    if ( deep (C [i]) < ( deep (C [j]))
       && (evaluate (C [i]) <evaluate
   (C [j]))) kill (C, K) ;}
```

KNOWLEDGE PROCESSING SYSTEM STRUCTURIZING TOOL

This application is a continuation of application Ser. No. 07/592,798, filed of Oct. 4, 1990 now abandoned.

BACKGROUND OF THE INVENTION

The present invention relates to a method of structurizing a knowledge processing system and a tool for structurizing the knowledge processing system.

A knowledge processing system generally comprises a knowledge base which stores therein knowledge coded in a machine-readable form for use in solving a problem and an inference program which uses the knowledge in a chaining fashion.

In contrast to the hitherto known problem solving program which is based on numerical processing for executing determinative algorithm processings, the knowledge processing system makes use of the knowledge given in a symbolic representation useful for solving a problem. This type of knowledge processing system is capable of dealing with empirical knowledge, know-how or heuristic knowledge such as those which the experts have acquired in various problem domains and which have been difficult to incorporate in the algorithms known heretoforce. For this reason, the knowledge processing system is increasingly employed widely not only for solving problems in the engineering field such as diagnosis, control, monitoring or supervision, planning and design but also in the field of legislation, money market and the like.

As methods of structurizing this knowledge processing system, there can be mentioned a method of establishing frame structures (conventions) for describing the knowledge and preparing the inference program using the knowledge in a chaining fashion with the aid of a symbol processing language such as LISP or PROLOG, and a method of using a knowledge processing system structurizing tool incorporating previously the knowledge describing frame structures and the inference program for using the frame structures. As a knowledge processing system structurizing tool, there are known "EMYCIN" described in Van Velle's "The Emycin Manual" contained in "The Stanford University Report No. STAN-CS-885", "ES/KERNEL" described in Kanamori et al's "Knowledge Representation Method and Rapid Inference Method in ES/KERNEL" contained in "HITACHI HYOURON", March 1987, pp. 17–22 and others. The first mentioned method is capable of setting up the knowledge representations, suited properly for solution of problems of concern and creation of inference programs. It is however noted that those who want to structurize the knowledge processing system is required to get skilled in the knowledge information processing technologies such as artificial intelligence, knowledge engineering or the like. Accordingly, it is difficult for those who are unaccustomed to these technological fields to structurize the knowledge processing system in accordance with the first mentioned method. On the other hand, the second mentioned method of utilizing the knowledge processing system structurizing tool does not require the preparation of the frame structures for knowledge representation and the inference program. However, the knowledge has to be described in such representation or expression which can be accepted by the knowledge processing system structurizing tool. Besides, for solving a problem of concern by resorting to the inference program, there is required examination of a method of composing the knowledge inputted as well as description of meta-knowledges for the inference control. Consequently, those who desire to structurize the knowledge processing system are required to be familiar with the knowledge concerning the object domain to which the problem to be solved pertains as well as the knowledge system structurizing tool to be used.

Such being the circumstances, there exists a great demand for development of such a method which allows even the unaccustomed person to structurize easily the knowledge processing system for solving a problem in the domain of concern (object domain).

In this regard, there is proposed by J. Laird and A. Newell a so-called general-purpose weak method in their article entitled "A Universal Weak Method: Summary of Results" 1983, Proceedings of the Eighth International Joint Conference on Artificial Intelligence. The proposed universal or general-purpose weak method is applied to solution of game problems. This method includes as the problem solving program (inference program) a plurality of weak methods based on a search procedure constituting a generic or universal problem solving procedure in various knowledge processing systems, wherein the knowledge processing system is structurized by establishing inference control knowledge proper to the domain of the problem to be solved. The abovementioned general-purpose weak method includes a plurality of weak methods including a hill-climbing method, a breadth-first search, a depth-first search and others.

The inventors of the present application have found after scrutinizing the universal or general-purpose weak methods the problems which will be elucidated below. The inventors started from a knowledge processing system structurizing tool created by applying the general-purpose (universal) weak method procedure. When a knowledge processing system is to be structurized for solving a problem with the aid of a conceived knowledge processing structurizing tool, the user of the knowledge processing system structurizing tool (hereinafter referred to simply as the user) selects a weak method to be made use of in solving the problem of concern. In that case, the user can certainly enjoy an advantage that the user can select the weak method suitable for solving the problem of concern, when compared with the case where the knowledge processing system is structurized by using the knowledge processing system structurizing tool described in "HITACHI HYOURON" mentioned hereinbefore. However, in order to structurize the knowledge processing system for solving a problem of concern by using the selected weak method, the user has to input the information by determining the inference control knowledges proper to a concerned problem to be solved as well as the inference control knowledge proper to the object domain to which the problem belongs. In that case, the information to be inputted is limited to the range improved by the selected weak method. However, it is extremely troublesome for the user to pay consideration to the knowledge such as mentioned above. It should additionally be mentioned that neither description nor suggestion is found in the article "A Universal weak Method" cited above concerning the inputting of the inference control knowledge proper to the concerned the problem to be solved and the knowledge proper to the object domain. The weak method to be selected naturally becomes different depending on the problems of concern. Consequently, such difficulty is encountered that another one of the inference control knowledge proper to the problem of concern and another one of the knowledge proper to the object domain have to be considered, respectively.

The knowledge processing system structurizing tool capable of utilizing the weak methods can certainly facilitate the structurization of the knowledge processing system by using that tool. However, the function of the inference program used in the structurized knowledge processing system is limited only to the functions of the existing weak methods incorporated in the structurizing tool.

As will be appreciated from the foregoing, it has been found that the knowledge processing system structurizing tool to which the conceived universal weak method is applied is incapable of structurizing the knowledge processing system for a given object domain and a given problem to be solved, because of the fact that the inference program of the structurized knowledge processing system is limited to the function of the existing weak method and that the inference control knowledge proper to the problem of concern and the knowledge proper to the domain which knowledge differ from one to another problem of concern have to be taken into consideration.

SUMMARY OF THE INVENTION

An object of the present invention is to provide a knowledge processing system structurizing method and a knowledge processing system structurizing tool which are capable of creating inference programs for given problems to be solved and given object domains.

It is another object of the present invention to provide a knowledge processing system structurizing method and a knowledge processing system structurizing tool which can facilitate inputting of information required for creating an inference program.

It is still another object of the present invention to provide a knowledge processing system structurizing method and a knowledge processing system structurizing tool which can facilitate creation of inference programs.

It is a further object of the present invention to provide a knowledge system structurizing method and a knowledge processing system structurizing tool which can facilitate preparation of knowledge bases required for execution of the inference programs created.

A feature of the present invention in achieving the object of the invention is characterized by selecting from a plurality of predetermined inference control knowledge stored in storage means for storing the inference control knowledge related to a problem of concern and creating an inference program related to the problem on the basis of the selected inference control knowledge.

Another feature of the present invention in achieving another object of the invention is characterized by displaying a plurality of predetermined inference control knowledge stored in storage means, selecting the inference control knowledge related to a problem of concern from the plurality of the predetermined inference control knowledges displayed on the display unit and creating an inference program related to the problem.

A further feature of the present invention in achieving a further object of the invention is characterized by creating an inference program concerning the problem on the basis of the selected inference control knowledge and a base program read out from the storage means.

Still another feature of the present invention in achieving another object is characterized by inputting knowledge required for executing a created inference program on the basis of selected inference control knowledge.

Since the inference program related to a problem of concern is created on the basis of inference control knowledge related to a problem of concern and selected from a plurality of predetermined inference control knowledge stored in a storage means, the inference control knowledge required for creating inference programs for given cases can previously be prepared, whereby an inference program is made available for a given problem to the solved and a given object domain (concerned domain).

By virtue of the feature that a plurality of predetermined inference control knowledge are displayed on the display unit and that the inference control knowledge related to a problem of concern are selected from the plurality of predetermined inference control knowledge displayed on the display unit, inputting of the information required for creating the inference program can be much facilitated.

An inference program related to a problem to be solved is created on the basis of the selected inference control knowledge and a general-purpose search program read out from the storage means. Creation of the inference program can be much facilitated owing to availability of the general-purpose search program serving as the base program.

Since the knowledge required for executing the created inference program are inputted on the basis of the selected inference control knowledge, inputting of the required knowledge can be facilitated with the creation of the knowledge base required for executing the created inference program being facilitated.

BRIEF DESCRIPTION OF THE DRAWINGS

FIGS. 2 and 3a and 3b are views for illustrating classified information of a problem solving strategy;

FIG. 4 is a view for illustrating search primitive functions and search fundamentary functions;

FIG. 8 is a view for illustrating a select menu of classified information for a problem solving strategy;

FIG. 9 is a view for illustrating converted values of answers to strategically classified items;

FIG. 10 is a view for illustrating default values of a task-frame;

FIG. 11 is a view showing a menu of search tree evaluation functions;

FIG. 12 is a view showing a menu of validity conditions concerning relative positions of nodes;

FIG. 13 is a view for illustrating time-serially the contents of the processing for execution of the processing procedure shown in FIG. 6;

FIG. 14 is a view for illustrating the content of a certain process planning problem;

FIG. 15 is a view showing concrete examples of answers to the strategically classified items inputted for solving the problem shown in FIG. 14;

FIG. 16 is a view for illustrating a knowledge base for program creation;

FIG. 19 is a view for illustrating a concrete example of a general-propose program for the search elementary function "check-goal-cond 1";

FIG. 24 is a view showing the contents of program element knowledges for a successful finish decision function which is the first search elementary function;

FIG. 25 is a view showing a concrete example of a program for the successful finish decision function applied to the problem shown in FIG. 14;

FIG. 26 is a view showing the contents of a program element knowledges for a link select function which is the fourth search elementary function;

FIGS. 30a and 30b are views for illustrating the contents of tasks 2 and 3 of a parent-child relation cell shown in FIG. 29;

FIG. 32 is a view showing answers obtained at the step 12 of FIG. 5 for the diagnosis shown in FIG. 31;

FIG. 34 is a view for illustrating a concrete example of the successful finish decision function applied to a problem shown in FIG. 31;

FIG. 41 shows, by way of example, a skeleton of search fundamental function employed according to the second embodiment;

FIG. 42 shows a first correspondence table containing correspondences established between search fundamental functions and search primitive functions employed in the second embodiment of the invention;

FIG. 43 is a view showing an evaluation function used in the second embodiment;

FIG. 45 is a view showing, by way of example, a skeleton of an active node update function employed in the second embodiment;

FIG. 46 shows a second correspondence table referred to in carrying out the second embodiment; and FIG. 47 shows an example of the active node update function generated ultimately.

DESCRIPTION OF THE PREFERRED EMBODIMENTS

Figure 2:
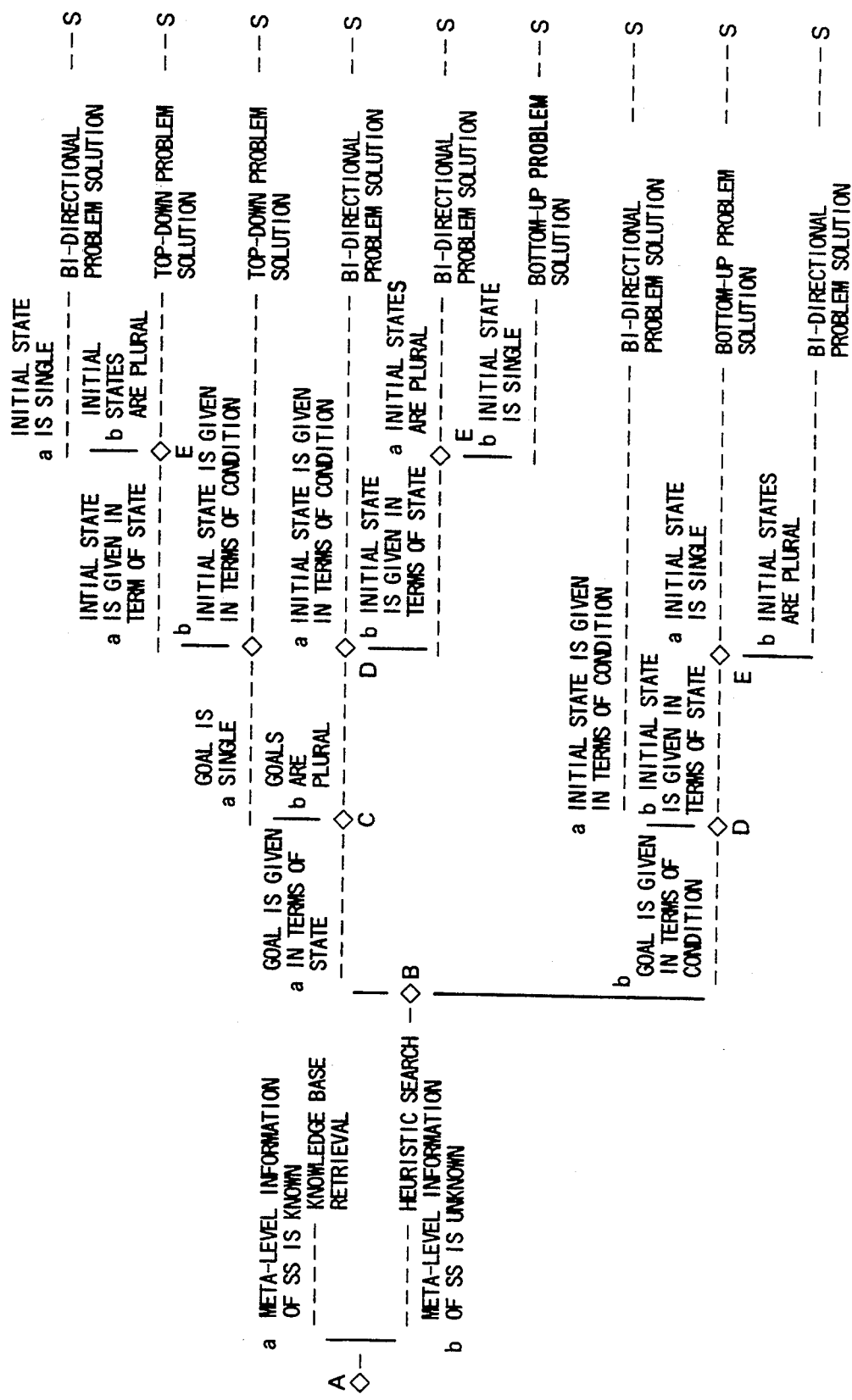

The present invention has been made on the basis of the results obtained after investigation and examination performed by the inventors of the present application on the knowledge processing systems applicable to solution of various problems. Among others, the inventors scrutinized systematically the information required for solving a variety of problems. As a result, there could be obtained such classified or sorted information for a problem solving strategy as illustrated in FIGS. 2 and 3. The classified information for the problem solving strategy is represented in the form of a classification tree of search strategy which includes strategically classified items A to I and others, as can be seen in FIGS. 2 and 3. More specifically, the classified information for the problem solving strategy includes the strategically classified items A, B, C, D, . . . , I branched as shown, starting from the leading item A. Parenthetically, each of the points "S" shown in FIG. 2 is to be linked to a point "S" in FIG. 3a, and each of the points "P" in FIG. 3a is linked to a point "P" in FIG. 3b. The classification downstream of "Q" reflects differences in the knowledges for search (inference) controls proper to domains of concern. As an example of the information for the classified items located downstream of "Q", there may be mentioned the information of a menu K (FIG. 12), which will be described later on. In FIG. 3b, a symbol "B.F." represents a breadth-first search, "D.F." represents a depth-first search, "Be.F" represents a best-first search, "M.M." represents a minimum-and-maximum search, "GBBM" represents a generalized branch-and-bound method, "H.C" represents a hill-climbing method, "A*" represents an A* algorithm, and "BBM" represents a branch-and-bound method. These types of classified information for the problem solving strategies are derived by classifying the problem solving strategies, i.e. the inference control strategies with regard to the individual items which prescribe the search problem such as the states realizing the problem space, operators acting on the states for bringing about changes thereof, state or condition describing a goal of the search, initial state or condition of the search, evaluation functions for selecting the operator and others. By selecting appropriately those of the strategically classified items which are relevant to the problem to be solved, it is possible to determine the information prescribing the problem space which is necessarily required for solving the problem of concern as well as the search control strategy for solving the problem. The classified information for the problem solving strategy comprises a systematic collection of knowledges and also includes a plurality of inference control knowledges for the individual items mentioned above, respectively. Above all, there should be mentioned a plurality of inference control knowledges proper to the problem to be solved and a plurality of the inference control knowledges proper to the object domain which the problem to be solved belongs to or concerns. This classified information for the problem solving strategy is based on the novel concept discovered by the inventors. Now, description will be made of an exemplary embodiment of the present invention in which the information based on the novel concept is made use of.

Figure 1:
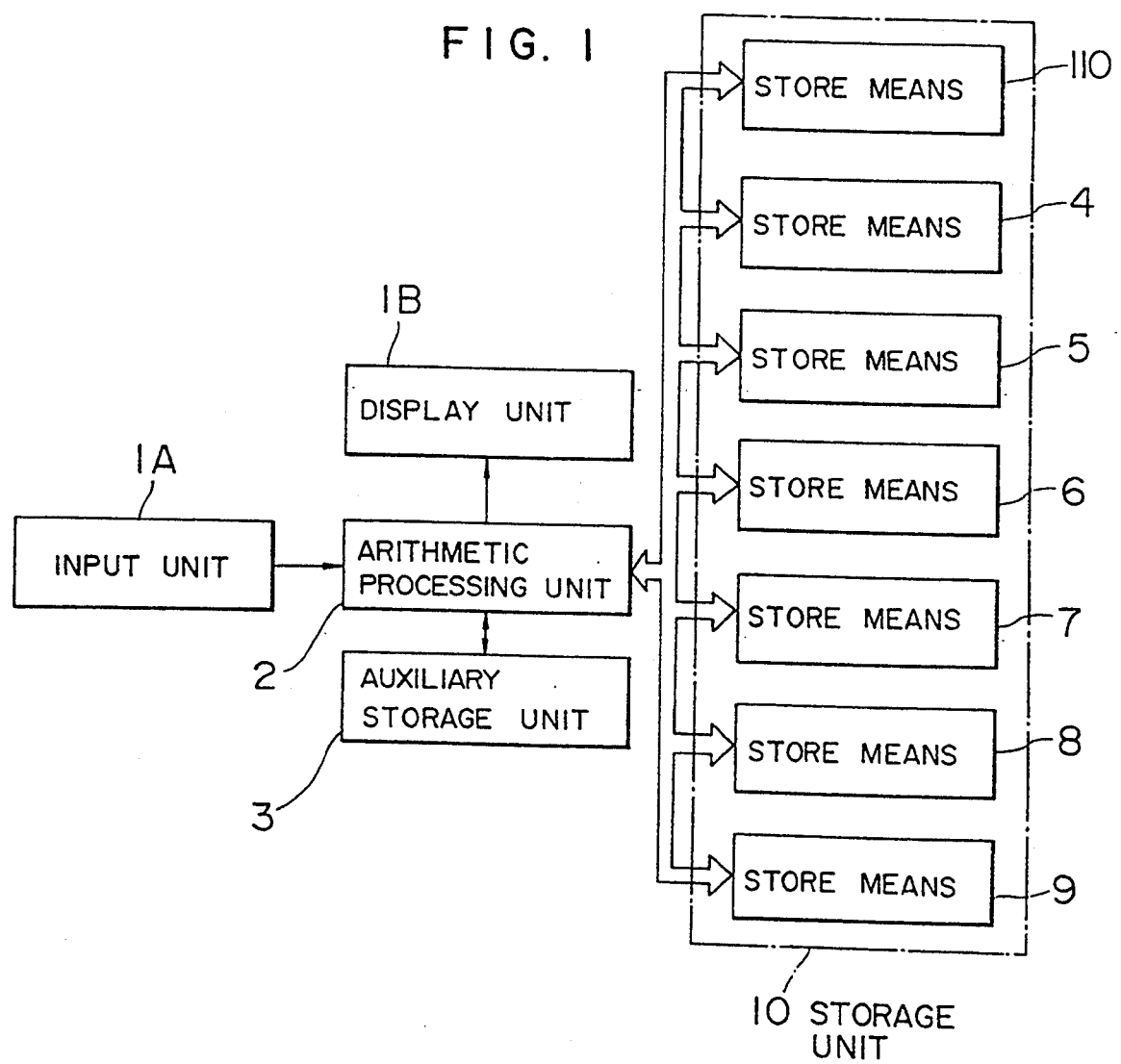
FIG. 1 is a block diagram showing a structure of a knowledge processing system structurizing tool, according to a first preferred embodiment of the present invention.

A tool for structurizing the knowledge processing system according to a preferred embodiment of the present invention will be described by reference to FIG. 1. 1 The knowledge processing system structurization tool according to the instant embodiment comprises an input unit 1A, a display unit 1B such as a CRT display or the like, an arithmetic processing unit (CPU) 2, an auxiliary storage unit 3 constituted by an internal memory and a storage unit 10 constituted by an external memory. The input unit 1A, the display unit 1B, the auxiliary storage 3 and the storage 10 are connected to the arithmetic processing unit (CPU) 2. The storage area of the storage unit 10 is divided into at least.six subareas which function as the store means 4 to 9, respectively.

The store means 4 serves to store the classified information for the problem solving strategy such as shown in FIGS. 2 and 3. The store means 5 serves to store search primitive functions (1.-12.) and search fundamental functions (13.-21.) shown in FIG. 4. It is noted that the search primitive functions and the search fundamental functions are called here as "search functions" as a whole. The store means 6 serves to store a processing procedure illustrated in FIG. 5. The store means 7 serves to store a general-purpose search program shown in a table 1 mentioned hereinafter. The store means 8 serves to store a problem solving program generated or created according to the teaching of the invention in the instant embodiment. The problem solving program is an inference program which is used in the knowledge processing system for solving the relevant problem. The store means 9 serves to store knowledges required necessarily for executing the problem solving program created according to the instant embodiment in the knowledge processing system. The knowledges mentioned above are inputted in accordance with the processing procedure mentioned above. In this conjunction, it should be noted that the processing procedure shown in FIG. 5 may also be stored in the auxiliary storage unit 3 rather than the storage unit 10. The store means 110 stores a correspondence table establishing correspondences between the search fundamental functions having the built-in search primitive functions and the search elementary functions with the program creating knowledge.

Figure 5:
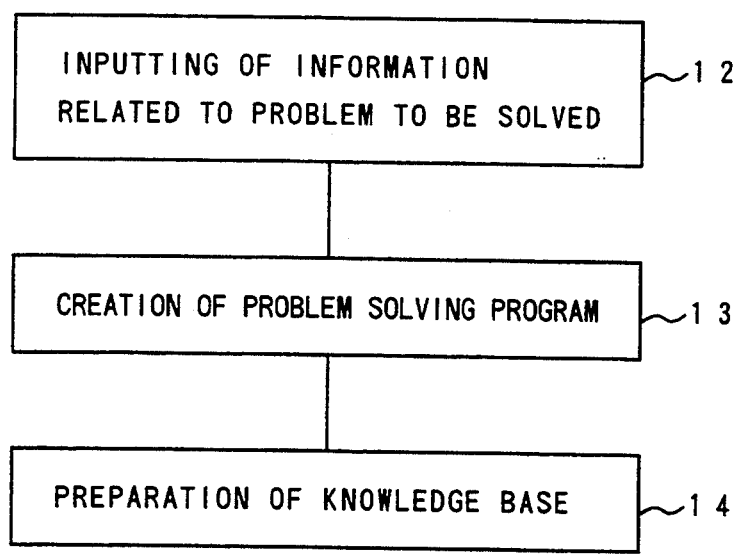
FIG. 5 is a view for illustrating a processing procedure executed by an arithmetic processing unit shown in FIG. 1.

The arithmetic processing unit (CPU) 2 responds to the inputting of a start signal to the input unit 1A by the user to thereby read out the processing procedure shown in FIG. 5 from the store means 6 for executing predetermined processings in accordance with the procedure. The contents of the processing executed by the arithmetic processing unit 2 will be described below in detail by reference to FIG. 5.

At first, at a step 12, the information relevant or related to a problem to be solved is inputted in accordance with the strategically classified individual items of the classified information for the problem solving strategy. The information inputted at this step 12 is stored in a predetermined storage area of the auxiliary storage unit 3. On the basis of this information, a knowledge base of a frame structure is prepared in the auxiliary storage unit 3. The knowledge base of the frame structure will hereinafter be referred to as the knowledge base for program creation (generation) or as the program creating (generating) knowledge base. At a step 13, the problem solving program is generated or created by using a predetermined general-purpose search program which provides the basis for the problem solving program and the program creating knowledge base. At a step 14, processing for inputting the knowledges (object knowledges) required for executing the created problem solving program in the knowledge processing system is performed to thereby create or generate the knowledge base. With the aid of the generated problem solving program (inference program) and the object knowledges, the knowledge processing system for solving the problem imposed can be implemented. In other words, the knowledge processing system thus realized includes the inference means for executing the inference program and the knowledge base which stores therein the object knowledges.

The contents of the processings executed at the steps 12, 13 and 14 will be described below in detail.

At first, description is directed to the processing step 12. This step comprises substeps or steps 27 to 34 shown in FIG. 6. Among them, the steps 33 comprises steps 33A to 33E, as shown in FIG. 7. At the step 27, information a and b of the strategically classified item A of the classified information for the problem solving strategy, i.e. the classified item A select menu (containing the information a and b) is read out from the store means 4, whereon the select menu (i.e. the menu for selection) is outputted to the display unit 1B as the initial pictorial information for guiding the user's inputting operation. The user then views the displayed select menu to select the information which is related to the problem to be solved and corresponds to the knowledge processing system to be implemented, whereon he or she inputs the selected information (either the information a or b) through the input unit 1A. In response, the arithmetic processing unit (CPU) 2 accepts as the input the selected information inputted through the input unit 1A as the answer A' to the classified item A (step 28). At the succeeding step 29, decision is made as to if the answer "indeterminable (not intelligible)" has been inputted or not. When this decision results in "NO" (negative), the processing proceeds to the step 30. On the other hand, when the decision at the step 29 results in "YES" the processing jumps to the step 35. At the step 30, the answer inputted for the strategically classified item is converted into an internal representation. This conversion is effected in accordance with the rules shown in FIG. 9. The rules shown in this figure are given in the form of relations between the input values and the converted values (internal representations) for every classified item (A, B, ..., K). For example, for the classified item A, the answer "a" is translated to the converted value "yes". Additionally, slot names or identifiers are correspondingly given to the classified items, respectively. As the slot names (identifiers), there are used "global-inf" "goal-condition-type" "operation-type" and others. The converted value represents the value of the associated slot. At the step 35, a corresponding default value is selected from those shown in FIG. 10 to be inputted. More specifically, the default value is selected through the medium of the slot name (FIG. 9) corresponding to the strategically classified item inputted at the step 28. The data shown in FIGS. 9 and 10 are stored in the storage unit 10 at predetermined storage areas. FIG. 10 shows an example of the knowledge of a frame "task-spec" represented in a frame structure. At the step 31, the internal representation obtained at the step 30 or the default value selected at the step 35 is stored in the auxiliary storage unit 3. At the step 32, decision is made as to whether the information for all the strategically classified items of the classified information for the problem solving strategy has been inputted or not. When this decision step results in "NO" the processing at the step 33 is executed.

The processing executed at the step 33 will be described by reference to FIG. 7. At first, at the step 33A, it is decided whether or not the select menu for the strategically classified item I has been displayed. The answer of the decision step 33A remains "NO" until the select menu for the strategically classified item I has been displayed on the display unit 1B. At the time point when the menu of concern is displayed, the select menu for the classified item succeeding to that for which the select menu has been displayed (e.g. the classified item B when the classified item A for which the menu has been displayed precedingly) is read out from the store means 4 (step 33B). When the decision made at the step 33A is "YES" it is then decided at the step 33C whether or not the answer "I'" concerning the classified item "I" inputted at the step 28 is the information a. When this decision results in "YES", a menu J of evaluation functions (FIG. 11) of the search tree is read out from the storage unit 10 at the step 33D. The menu J contains the evaluation functions for the relative positional relations of nodes in the search tree. When the decision at the step 33C is "NO", a menu K of the validity conditions (FIG. 12) concerning the relative positions of nodes which prescribe the developement or unfolding of the nodes is read out from the storage unit 10 at the step 33E. The processing at this step 33E is executed even in the case the processing at the step 33D has been executed.

At the step 34 (FIG. 6), information of the select menu, the menu J or the menu K obtained at the step 33B, 33D or 33E is supplied to the display unit 1B. There is displayed on the display unit 1B the information contained in one of the abovementioned menus. The user selects one of the information from the first or second item in each of the menus J and K, respectively. Subsequently, the processing through the steps 28 to 34 (including the step 35, as the case may be) is repeatedly executed until the decision at the step 32 results in "YES".

Figure 6:
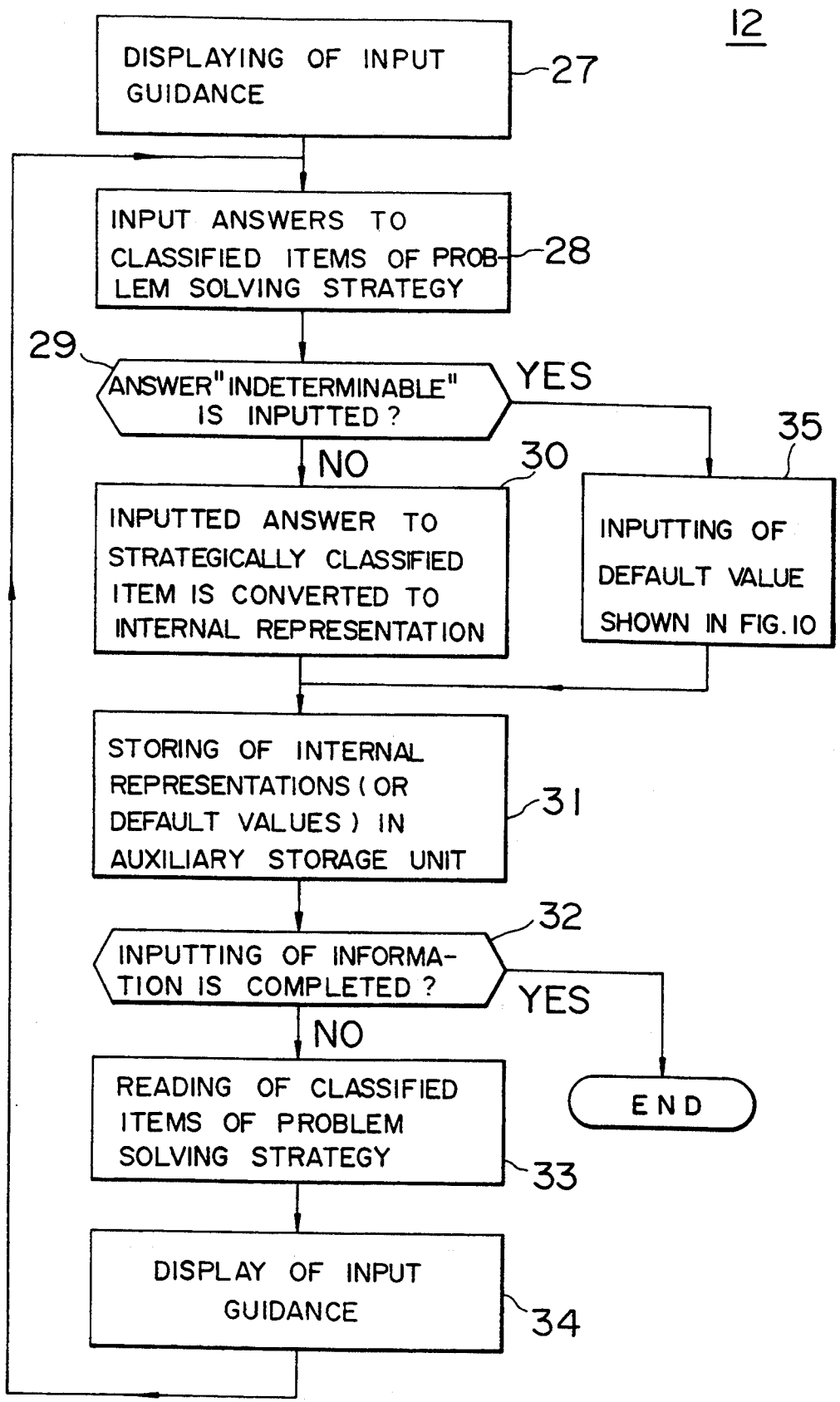
FIG. 6 is a view for illustrating in detail a processing procedure executed at a step 12 shown in FIG. 5.
Figure 7:
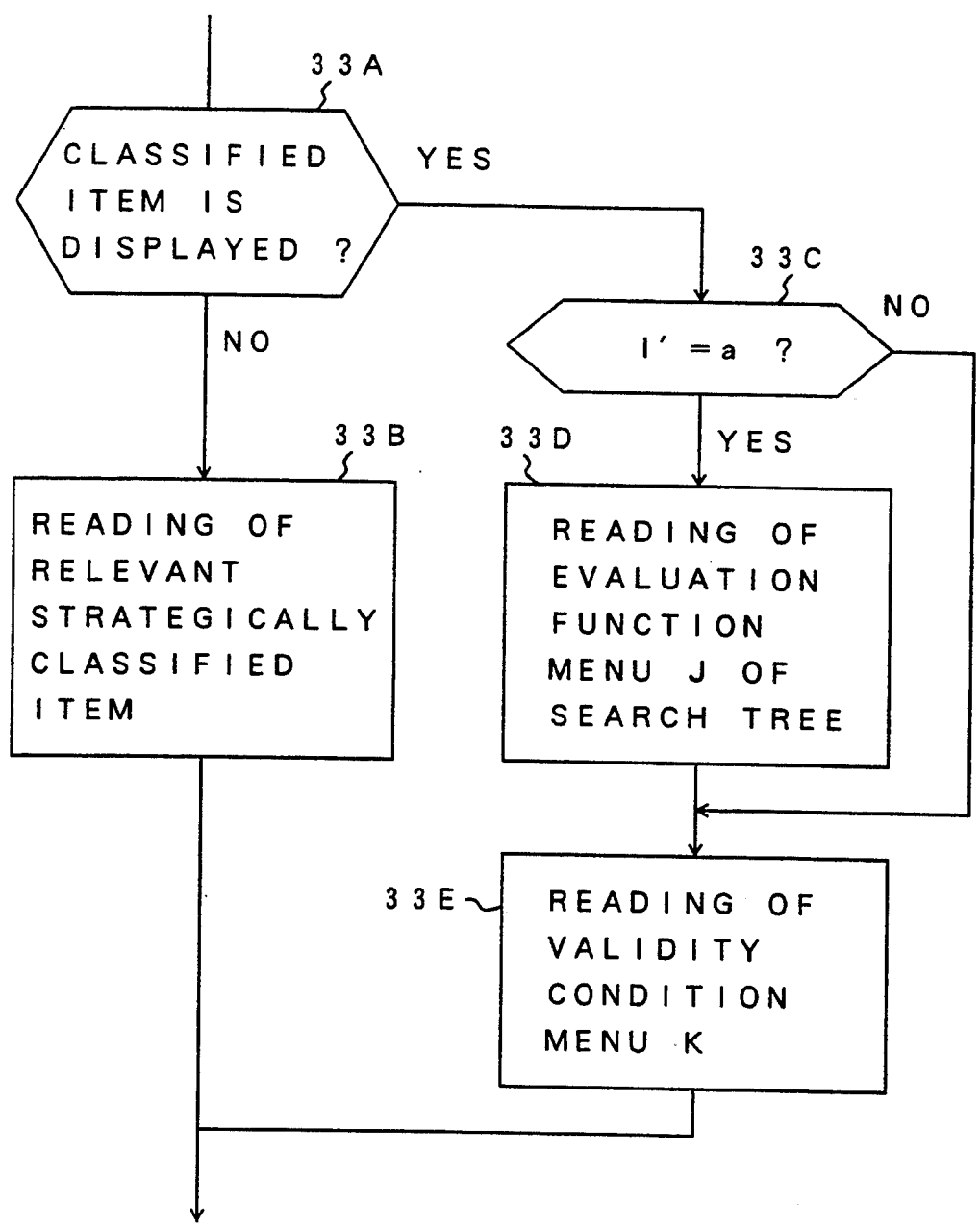
FIG. 7 is a view for illustrating in detail a processing procedure to be executed at a step 33 shown in FIG. 6.

The processing repeated until the decision at the step 32 shown in FIG. 6 results in "YES" can be time-serially expressed by a series of successive steps 15 to 26, as shown in FIG. 13. In displaying of the classified items at the steps 15 to 26, the relevant one of the menus shown in FIGS. 8, 11 and 12 is generated on the display unit 1B. The answers "A'" to "K'" shown in FIG. 13 are transformed into internal representations to be subsequently stored in the auxiliary storage 3 at the areas designated by the slot values of the program creating knowledge base shown in FIG. 16 at the step 31, as will be described later on.

The information of the select menu shown in FIG. 8, the information of the menu J shown in FIG. 11 and that of the menu K shown in FIG. 12 prescribe the search space (problem space) for solving the object problem of concern and constitute the information of the strategically classified items (inference control knowledges). Each of the information of the select menu for the strategically classified items A to I and that of the menu J represents the inference control knowledges proper to the problem to be solved. Further, each of the information contained in the menu K is the inference control knowledge proper to the object domain to which the problem to be solved belongs. In this conjunction, it is intended to mean with the phrase "object domain" the domain to which the implemented or structurized knowledge processing system is to be applied. As examples of such domain, there may be mentioned a thermal power plant, a nuclear power plant, an elevator system, an FA (Factory Automation) system, a maintenance back-up system, a CAD (Computer-Aided Design) system or the like.

FIG. 14 shows a concrete example of the problem for making a plan or schedule for a manufacturing process. The problem is to make such a plan that the overall work time becomes minimum for three tasks (i.e. task 1, task 2 and task 3 shown in FIG. 14) constituting the object domain on the constraint that the number of workers at any given time point is less than four, inclusive. For structurizing the knowledge processing system to be applied for solving this problem, it is assumed that the processing at the step 12 shown in FIG. 5 is performed. On this assumption the answers "A" to "K" to the strategically classified items, respectively, inputted at the step 28 are such as shown in FIG. 15. These answers "A'" to "K'" are translated to the internal representations at the step 30 to be subsequently contained in the program creating knowledge base which is stored in the auxiliary storage 3 as the program creating knowledges each of the frame structure. A program creating knowledge base having the frame name or identifier "task-spec" is shown in FIG. 16. The frame "task-spec" includes 14 slots having the values given in terms of the internal representations of the answers "A'" to "K'". Incidentally, the value of the slot "goal-condition-place" is the converted value of the classified item J-1 (FIG. 9) and equal to the value of the slot "parent-relation". It can be said that the program creating knowledge base (FIG. 16) prepared on the basis of the processing illustrated in FIG. 6 contains the inference control knowledges proper to the problem and based on the answers "A'" to "J'" and additionally contains the inference control knowledge proper to the object domain of the problem to be solved and based on the answer "K'". To say in another way, the program creating knowledge base contains a plurality of inference control knowledges selected from the classified information of the problem solving strategy. In the case of the illustrated embodiment of the present invention, the program creating knowledge base can be prepared by making use of the classified information (shown in FIGS. 2, 3, 11 and 12) for a predetermined problem solving strategy systematically prepared previously.

In case the user is incapable of identifying the information relevant to the problem to be solved and incapable of selecting the corresponding information from those for the strategically classified items, the relevant default value is selected from those shown in FIG. 16 at the step 35, as described hereinbefore. This selected default value constitutes the value for the corresponding one of the slots shown in FIG. 16. By using the default value as the relevant slot value in this manner, the system according to the illustrated embodiment of the invention can function satisfactorily even when the user did not select the displayed information. Besides, according to the teachings of the invention in the illustrated embodiment, there can be obtained the knowledges for the program creation which reflect the inference control knowledges proper to the problem to be solved as well as inference control knowledge proper to the object domain of the problem to be solved for a given problem of a given object domain.

The processing performed at the step 12 (FIG. 5) can now be understood from the above. Now, description will be turned to the processing performed at the step 13.

Before entering into detailed description of the processing at the step 13, the outline of the general-purpose search program (general-purpose inference program) stored in the store means 7 will be mentioned. This general-purpose search program provides a base for a problem solving program to be created at the step 13. The general-purpose search problem shown in the table 1 mentioned below is represented in the form of rules by adopting an object-oriented programming procedure. The general-purpose search program contains rule groups for initialization, labeling, search execution, display of results and error message. Each of the rule groups or sets includes one or plural rules each of which is affixed with a label indicating the content of the relevant processing. For each of the rules, the knowledge (e.g. slot value) stored in each of the frames such as those "control", "task-spec", "search-kernel" etc is taken out for making the decision for the given conditions to thereby perform the processing as required. In the table 1, the item beginning with "@" represents the slot of the associated frame. In practice, the processing is performed by transmitting a message to the corresponding frame, as indicated by a symbol "←" in the table 1.

TABLE 1

GENERAL-PURPOSE SEARCH PROGRAM

{Initialization}
 {Rule 1
   if (control @ object → ?obj
       @ refer = off)
   then (← control assign("refer", "on")))
{Labeling}
 (Labeling
   if (search-kernel @ test = on)
       (task-spec @ link-type = link)
       (control @ object → ?obj)
   then (← search-kernel label(?obj,?obj))
       (← search-kernel assign(test,off))
       (← system print("node", "labeled")))
 (Establish of initial node
   if (← ?search-cell  @ node-type = chip
                        @ search-st = yet)
   then (← ?search-cell assign("search-st",
        "current"))
        (← control add-active-c(?search-cell))
        (← control assign("stage",
        "select-node")))
{Execution of Search}

TABLE 1-continued

GENERAL-PURPOSE SEARCH PROGRAM (Decision for goal condition
   if (control @ step → ?step)
       (search-cells @ search-st = current
       @ step < ?step)
       (control @ goal-c !* = ?search-cell)
   then (← ?search-cell establish-check)
        (← ?search-cell assign("step",?step)))
 (Finishing condition 1
   if (control @ stage = check-goal
       @ finishing-cond = yes)
   then (event-reset (output)))
 (Goal node establish 1
   if (cntrol @ active-c * = ?search-cell)
       (?search-cell @ r-es-cond-st = yes)
       (control @ goal-c !* = ?search-cell)
   then (← control add-goal (?search-cell))
        (← control check-goal-condl))
 (Goal node establish 2
   if (control @ active-c = { })
       (task-spec @ goal-condition-place
       = deepest)
   then (← control check-goal-cond2)
        (← control assign("stage",
        "check-goal")))
 (In case the finishing condition is failed
   if (control @ stage = check-goal)
   then (← control assign("stage",
        "select-node")))
 (Selection of node
   if (control @ stage = select-node)
   then (← control select-node)
        (← control assign("stage",
        "select-link")))
 (Selection of link
   if (control @ stage = select-link
       @ open-node → ?node)
       (task-spec @ link-type = link)
   then (← control assign("stage","counter"))
        (← control select-link(?node)))
 (Selection/application of operator
   if (task-spec @ link-type = function
       @ stage = select-link
       @ open-node → ?node)
   then (← control select-function(?node))
        (← control assign("stage","counter")))
 (Update of active node
   if (control @ stage = reset-active-node)
       (?link @ all-current = yes
       @ check = no)
   then (← control reset-active-node))
        (← control assign("stage","check-goal"))
 (Finishing condition 2
   if (control @ active-c = { })
   then (event-reset(error-output)))
 (Counter
   if (control @ stage = counter
       @ step → ?step)
   then (← control assign("stage",
        "reset-active-node"))
        (← control assign("step", int(?step + 1)))
        (← control reset-active-node)
        (← system print("YnNow Search Step
        %d", ?step)))
{Display of Result}
 (Output of result
   if (control @ stage = check-goal)
       (?search-cell @ r-es-cond-st = yes)
       (control @ active-c *= ?search-cell)
   then (← system print("Yn Result %s",
        ?search-cell))
        (event-reset (end)))
{Error Message}
 (Error output
   if (control @ stage → ?st)
   then (← system print("$n Search is
        failed:::%s", ?st))
        (event-reset (end)))

The general-purpose search program of the table 1 becomes executable by placing the concrete knowledges for the program creation in a frame "task-spec" (hereinafter also referred to as the task-spec frame) while placing a concrete program in a frame "control" (hereinafter also referred to as the control frame). In other words, by giving simply the information required for solving the object problem of concern to the above-mentioned frames of the genera-purpose search program, there can be obtained an appropriate program adapted for solving the problem imposed.

Figure 17:
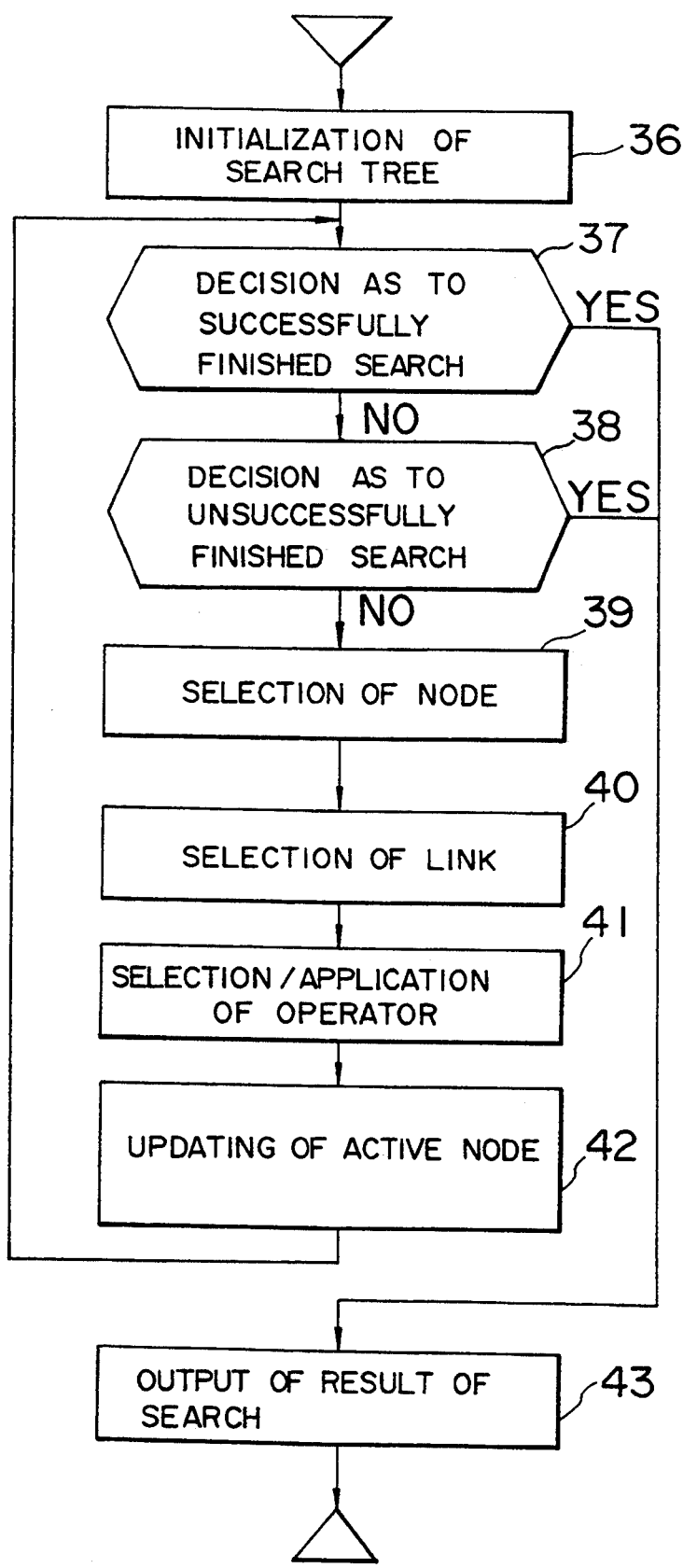
FIG. 17 is a view showing the contents of a major portion of a general-purpose search program.

FIG. 17 shows major portions of the general-purpose search program of the table 1, which include steps for initialization of the search tree (step 36), decision for successfully finished search (step 37), decision for unsuccessfully finished search (step 38), selection of node (step 39), selection of link (active element) (step 40), selection/application of operator (step 41), selection of active node (step 42) and outputting of the results of the search (step 43). When the decisions made at the steps 37 and 38 result in "YES", the processing of the step 43 is sequentially performed. Upon completion of the processing of the step 42, the processing of the step 37 is again executed. On the other hand, when the decisions made at the steps 37 and 38 result in "NO" processings of the steps 36 to 42 are sequentially executed.

In the general-purpose search program shown in the table 1, "Initialization" and "Labeling" correspond to the step 36 shown in FIG. 17, "Finishing condition 1" and "Goal node establish 1" correspond to the step 37 in the same figure, "In case finishing condition is failed" and "Goal node establish 2" correspond to the step 38, "Selection of node" corresponds to the step 39, "Selection of link" corresponds to the step 40, "Selection/application of operator" corresponds to the step 41, "Update of active node" corresponds to the step 42, and "Output of result" corresponds to the step 43, respectively. Parenthetically, the processings "Decision for goal condition" "Finishing condition 2" "Counter" and "Error output" contained in the general-purpose search program shown in the table 1 are omitted from illustration in FIG. 17.

Figure 18:
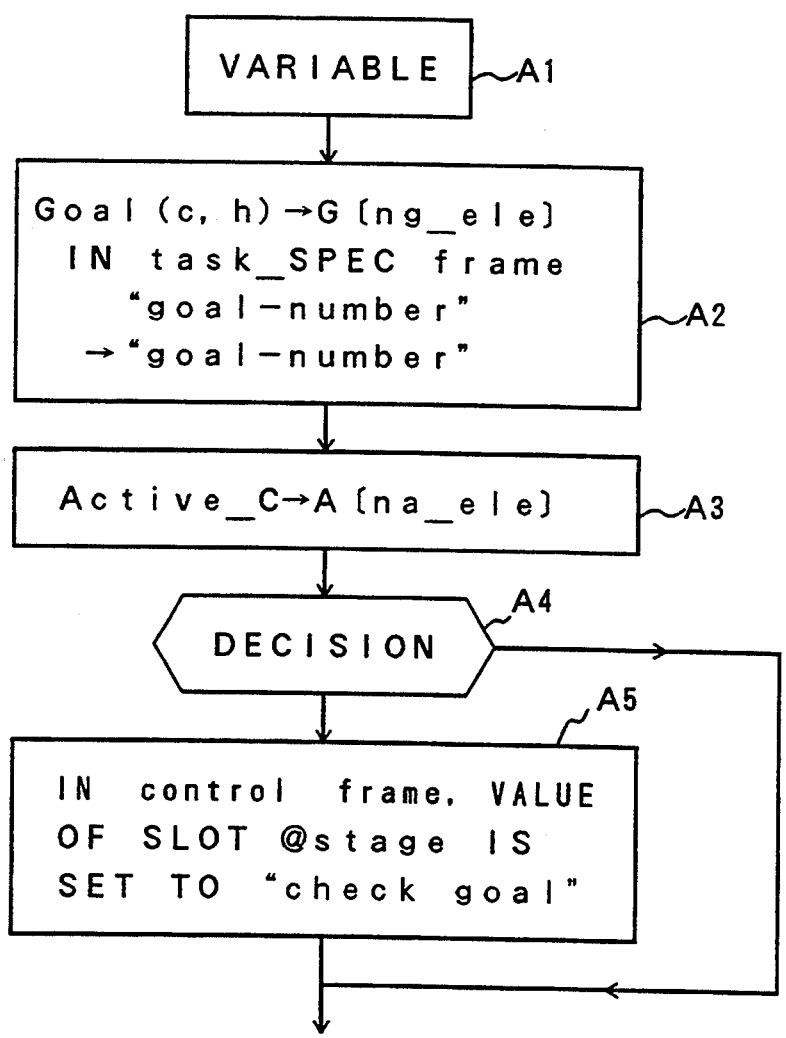
FIG. 18 is a view for illustrating the contents of a general-purpose program for a search elementary function "check-goal-cond 1"

FIG. 18 shows a general-purpose program for a search elementary function "check-goal-cond 1" included in "successfully finished decision" of the general-purpose search program shown in the table 1. The general-purpose program shown in FIG. 18 includes five program elements $A_1$ to $A_5$. The program element $A_1$ has a number of variables required for realizing the search elementary function "check-goal-cond 1" in accordance with the knowledge of "task-spec frame". The program element $A_2$ is to serve for executing the processing for placing a search fundamental function "Goal (c,k)" (FIG. 4) read out from the store means 5 in a variable "G [ng_ele]" while placing the value of the slot "goal-number" of the task-spec frame in a variable "goal-number". The program element $A_3$ is to perform the processing for placing a search fundamental function "Active c(k)" read out from the store means 5 in a variable "A[na_ele]". The program element $A_4$ is to perform the decision processing. The program element $A_5$ serves for a function to place the value of the slot "@stage" of the control frame. The variables "G[ng_ele]", "goal-number" and "A[na_ele]" are variables of the search elementary function "check-goal-cond 1". The program elements $A_1$ to $A_5$ are interlinked in the order to be processed, as shown in FIG. 18. The program elements $A_1$ and $A_4$ are variable type program elements which can be altered or varied in accordance with the inference control knowledges proper to the to-be-solved problem entered in the task-spec frame mentioned above (FIG. 16). The program elements $A_1$ and $A_4$ are designed for application to a particular program to be solved in a particular object domain on the basis of the inference control knowledge. All the other program elements $A_2$, $A_3$ and $A_5$ are fixed type program elements which are insusceptible to the influence of the inference control knowledges proper to the problem to be solved and the inference control knowledges proper to the object domain of the problem to be solved. Thus, it is safe to say that the general-purpose program for the search elementary function "check-goal-cond 1" comprises the variable type program elements susceptible to the influence of the inference control knowledges proper to the problem to be solved and the fixed type program elements mentioned just above. FIG. 19 shows a concrete example of the general-purpose program for the search elementary function "check-goal-cond 1". This general-purpose program is written in a C-language.

Figure 20:
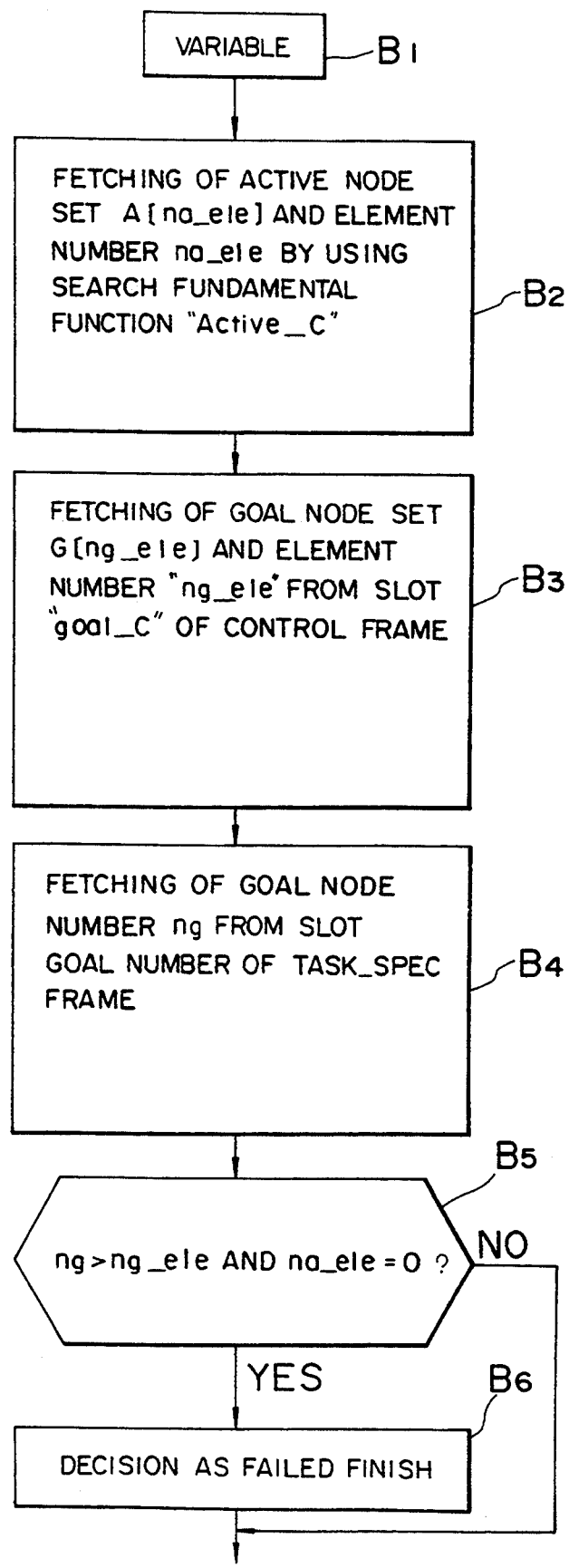
FIG. 20 is a view showing the contents of a general-purpose program for a search elementary function "check-goal-cond 2"

FIG. 20 shows a general-purpose program for the search elementary function "check-goal-cond 2" employed in "Failed finishing decision" of the general-purpose search program. The general-purpose program shown in FIG. 20 comprises six program elements $B_1$ to $B_6$. The program element $B_1$ contains variables required for realizing the search elementary function "check-goal-cond 2" in accordance with the knowledges of the task-spec frame. The program element $B_2$ is to perform the processing for fetching a set of active nodes (active node set) "A[na_ele]" which are variables of the search elementary function "check-goal-cond 2" and the number of elements (element number) "na_c(k)" read out from the store means 5. The program element $B_3$ has a function of taking out a set of goal nodes "G[ng_ele]" which are variables of the search elementary function "check-goal-cond 2" and the number of elements "ng_ele" from the slot "goal-c" of the control frame. The program element $B_4$ serves to execute the processing for taking out the value of the slot "goal-number" of the task-spec frame as the number of the goal nodes "ng". The program element $B_5$ serves for making decision as to whether the conditions that ng>ng_ele and that na_ele =0 are satisfied. The program element $B_6$ is for making decision of the failed (unsuccessful) finishing. The program element $B_1$ is a variable-type program element susceptible to the influence of the inference control knowledges inherent or proper to the problem to be solved, as with the case of the program element $A_1$. The other program elements $B_2$ to $B_6$ are fixed type program elements. Thus, the general-purpose program for the search elementary function "check-goalcond 2" contains the variable type program element susceptible to the influence of the inference control knowledges proper to the problem to be solved and the fixed type program elements as well.

A general-purpose program of the search elementary function "select-node" for the node selection in the general-purpose search program has eight major program elements, although they are not shown. Some of these program elements are of the fixed type while the others are of the variable type, as mentioned above. The program elements of the variable type depend on the values of the slots "parent-relation" and "sibling-relation" of the task-spec frame.

Figure 21:
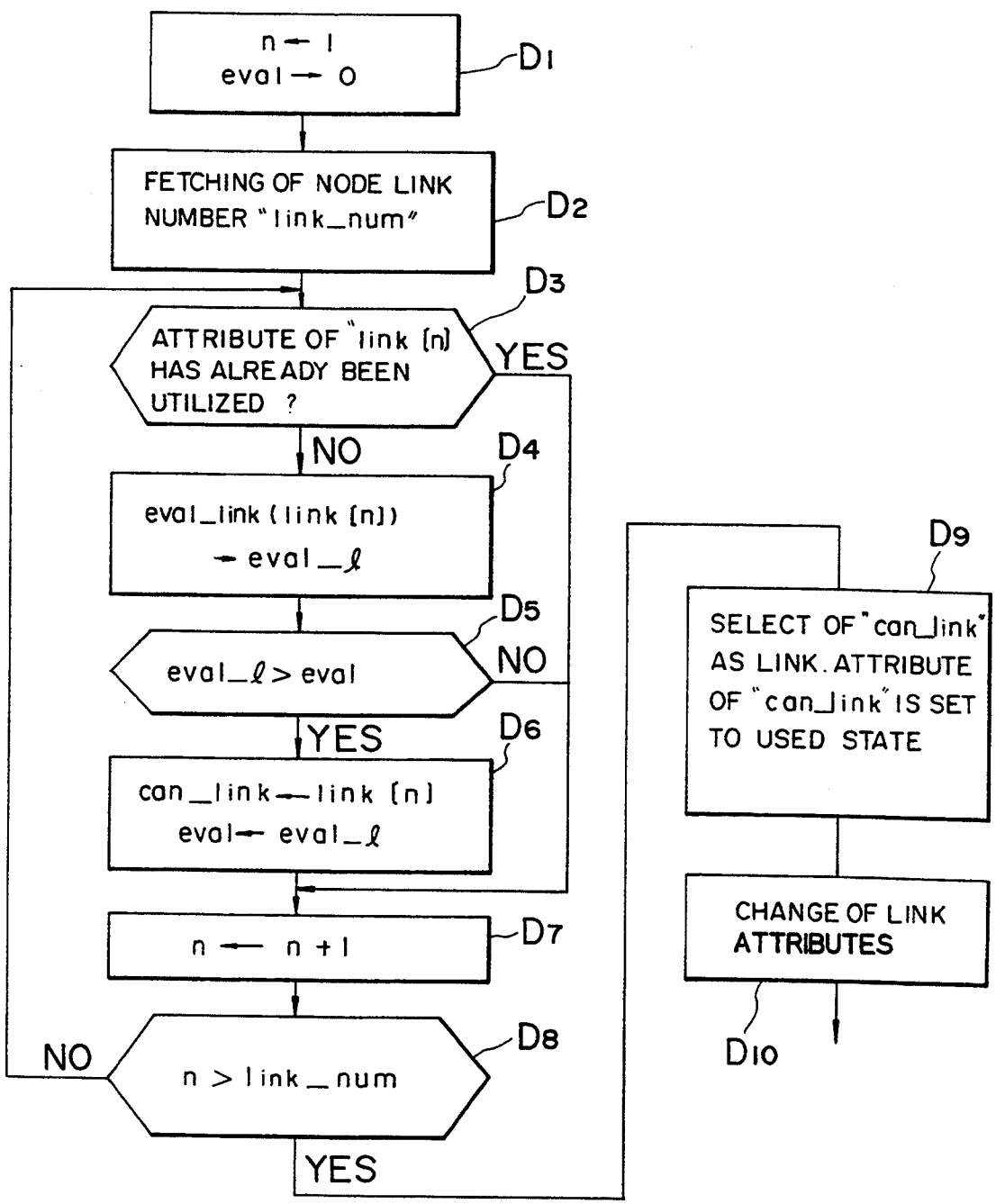
FIG. 21 is a view for illustrating the contents of a general-purpose program for a search elementary function "select-link"

A general-purpose program for the search elementary function "select-link" in the "link selection" of the general-purpose program has ten program elements $D_1$ to $D_{10}$ (FIG. 21). The program element $D_1$ serves to place "1" in a variable n and place "0" in a variable "eval". The program element $D_2$ is to perform the processing for taking out the number of inter-node links "link_num". The program element $D_3$ has a function of making decision as to whether or not the attribute of the variable "link[n]" has already been made use of. The program element $D_4$ serves to place a variable "eval_link (link[n])" in a variable "eval 1". The program element $D_5$ serves for making decision as to whether or not the variable "eval_1" is greater than the variable "eval". The program element $D_6$ is to execute the processing for placing the variable "link[n]" in a variable "can link" while placing the variable "eval_1" in the variable "eval". The program element $D_6$ is to execute the processing for placing the variable "link[n]" in a variable "can_link" while placing the variable "eval_1" in the variable "eval". The program element $D_7$ has a function of placing a variable (n+1) in a variable n. The program element $D_8$ serves to decide whether or not the variable n is greater than the link number "link_num". The program element $D_9$ selects the variable "can_link" as a link while setting the attribute of the variable "can link" to the state already used. The program element $D_{10}$ has a function of changing or altering the attribute of the link. The variables "n" "eval" "link[n]", "eval_link (link[n])", "eval_1", "can_link and "(n+1)" are variables of the "search elementary function "select-link". The program elements $D_1$ to $D_{10}$ are interlinked in the order illustrated in FIG. 21. The program elements $D_1$ to $D_9$ are of the fixed type. The program element $D_{10}$ is a variable type program element (contained in the task-spec frame) altered or changed on the basis of the inference control knowledge proper to the object domain of the problem to be solved. Thus, the general-purpose program for the search elementary function "select-link" contains the variable type program elements susceptible to the influence of the inference control knowledges proper to the object domain of the problem to be solved and the fixed type program elements.

A general-purpose program for the search elementary function "select-function" in the "Selection/application of operator" of the general-purpose search program has six main program elements. All of the program elements of this general-purpose program of the search elementary function "select-function" are of the fixed type.

The initial program elements for the search elementary functions "check-goal-cond 1", "check-goal-cond 2", "Select-node", "select-link" and "select-function" of the general-purpose program are stored in the store means 7 in correspondence with the individual control elementary functions, respectively.

Figure 22:
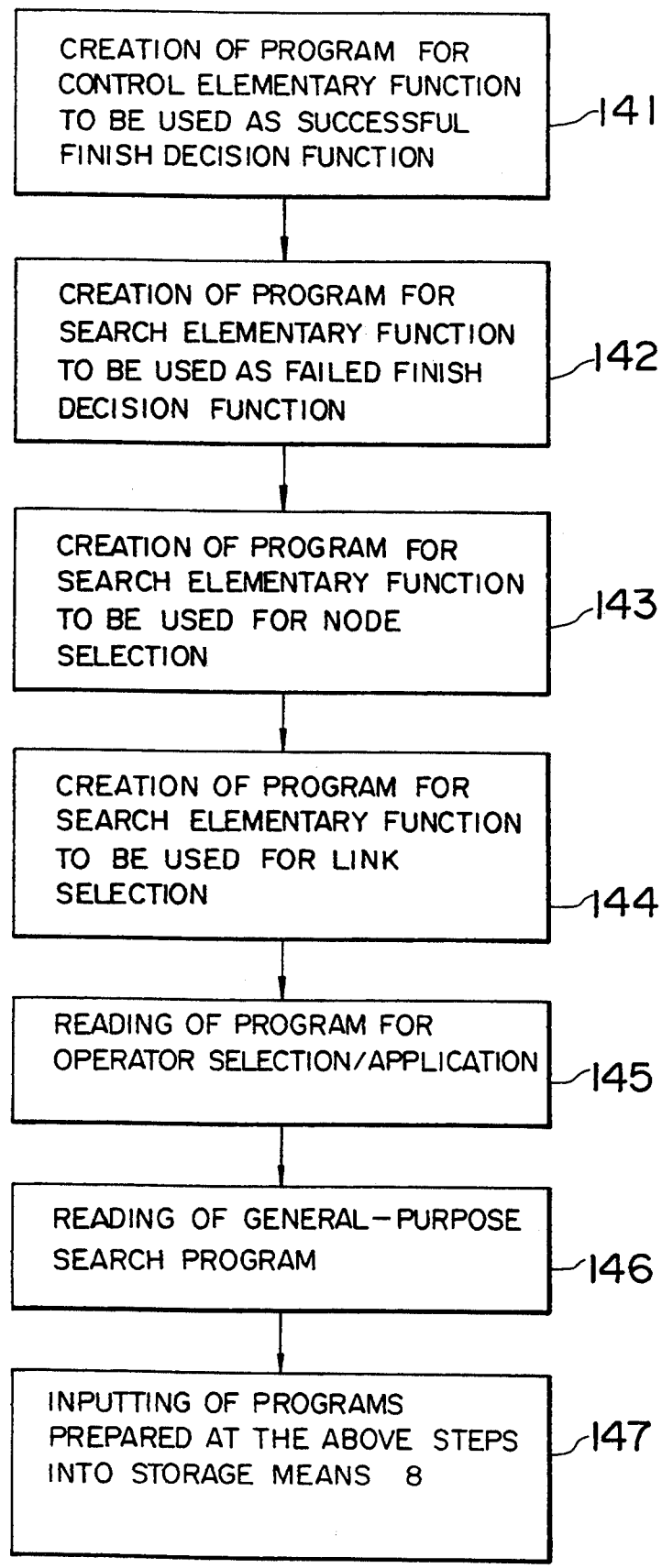
FIG. 22 is a view for illustrating in detail the processing procedure executed at the step 13 shown in FIG. 5.

From the above description, the contents of the general-purpose search program will be understood. Next, description will be made in detail of the creation or preparation of the problem solving program performed at the step 13. Referring to FIG. 22, the step 13 comprises processing steps 141 to 147 which are sequentially executed in the order shown in this figure. In the first place, there is prepared at the step 141 a program for the search elementary function "check-goal-cond 1" (hereinafter referred to as the successful finish decision function) to be used for making decision as to the successfully finished search at the step 37 shown in FIG. 17. Next, at a step 142, a program for the search elementary function "check-goal-cond 2" (hereinafter referred to as the failed finish decision function) is prepared to be used for making decision as to the unsuccessfully finished search at the step 38 (FIG. 17). Subsequently, at a step 143, a program for the search elementary function "select-node" (hereinafter referred to as the node select function) is prepared to be used for the node selection at the step 39 (FIG. 17). At the step 144, a program for the search elementary function "select-link" (hereinafter referred to as the link select function) is prepared to be used for the link selection at the step 40 shown in FIG. 17. The individual programs prepared at the steps 141 to 144 are stored in the auxiliary storage unit 3. At a step 145, program for the search elementary function "select-function" to be used for the operator selection/application at the step 141 is read out from the store means 7 to be subsequently stored in the auxiliary storage unit 3. At a next step 146, the general-purpose search program shown in the table 1 is read out from the store means 7 to be subsequently stored in the auxiliary storage unit 3 (step 146). Through the steps 141 to 146, the problem solving programs capable of being applied to a particular object domain and solving a particular problem to be solved, as desired by the user, can be prepared automatically. At the final step 147, the problem solving program thus created is read out from the auxiliary storage unit 3 to be subsequently stored in the store means 8.

Now, description will be directed to the creation of the programs for the successful finish decision function, the failed finish decision function, the node select function and the link select function in which the program preparing knowledges are reflected.

Figure 23:
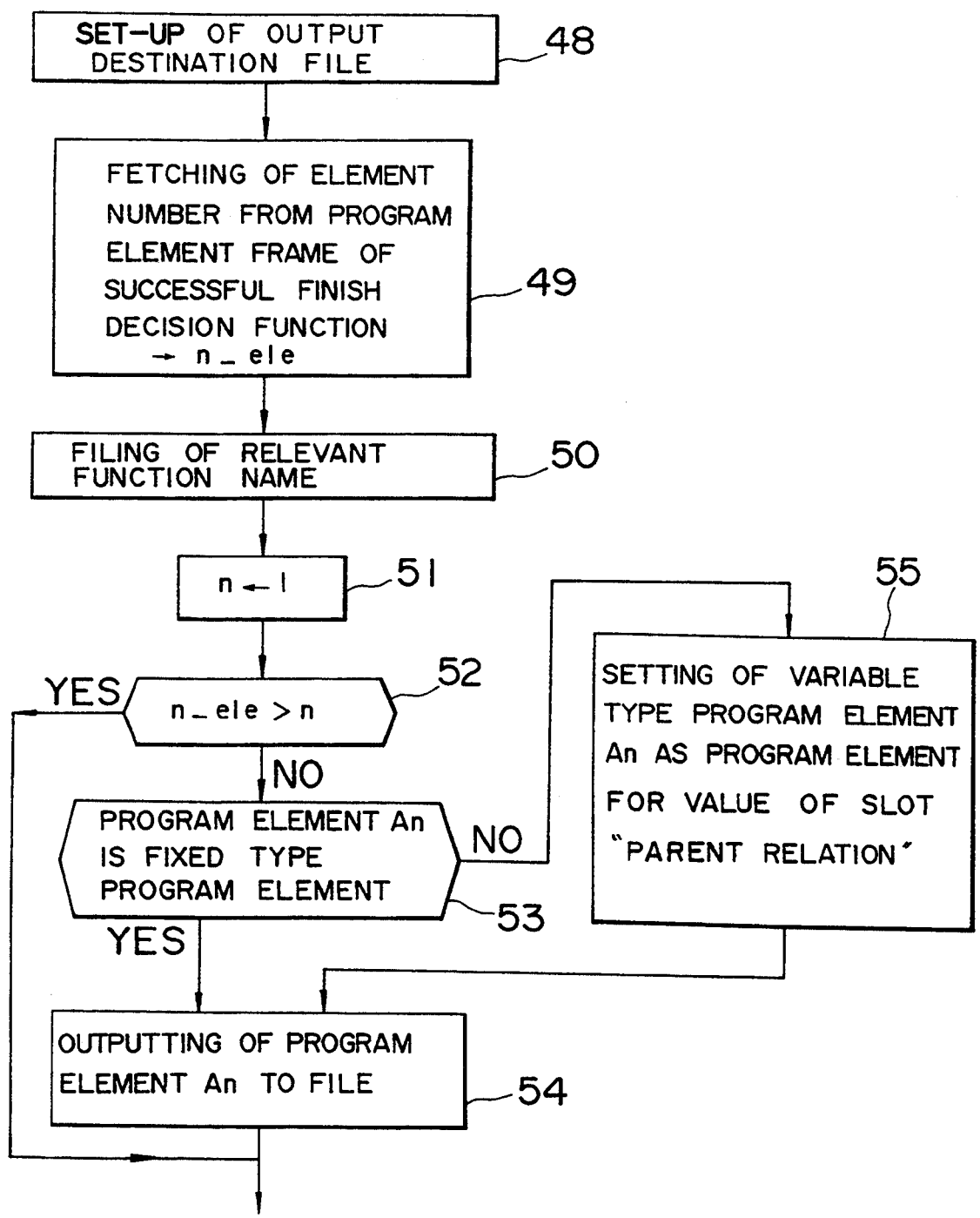
FIG. 23 is a view for illustrating in detail a processing procedure executed at the step 141 shown in FIG. 22.

FIG. 23 shows in detail the contents of the step 141 for preparing the successful finish decision function. At first, an output destination file is set at a step 48. To this end, the auxiliary storage unit 3, by way of example, may be used. The number of the program elements is derived from the program element knowledges for the successful finish decision function of the frame structure and placed in the variable "n_ele" (step 49).

FIG. 24 shows the contents of the program element knowledges for the successful finish decision function. The program element knowledges for the successful finish decision function includes a knowledge which indicates that the number of the program elements for the successful finish function is five, although not shown. The knowledges of the frames "program element $A_1$" and "program element $A_4$" included in the program element knowledges for the successful finish decision function will be considered. The knowledges of the frame "program element $A_1$" prescribe the variables which the program element $A_1$ is to assume in correspondence to the values of the slots "parent-relation" of the task-spec frame. More specifically, the program element $A_1$ becomes a program element CGC1 when the value of the slot "parent-relation" is "deepest" while the program element $A_1$ becomes a program element CGC2 when the value of the slot "parent-relation" is "shallowest". Additionally, when the value of the slot "parent-relation" is "no" the program element $A_1$ becomes a program element CGC3. The knowledges of the frame "program element $A_4$" prescribe the conditions for decision which the program element $A_4$ is to assume in correspondence to the values of the slot "parent-relation" of the task-spec frame. More specifically, the program element $A_4$ becomes a program element CGC4 when the value of the slot "parent-relation" is "deepest". When the value of the slot "parent-relation"

is "shallowest" the program element $A_4$ becomes a program element CGC5. Further, when the value of the slot "parent-relation" is "no" the program element $A_4$ becomes a program element CGC6.

At the step 49, five is placed in the variable "n_ele". The name or identifier of the successful finish decision function "check-goal-cond 1" is outputted to the file as set (e.g. the auxiliary storage unit 3) at the step 50. Value "1" (one) is placed at n (step 51). At a step 52, decision is made as to whether or not the condition that n_ele $>$ n is satisfied (step 52). When the decision at the step 52 results in "YES", the processing at the step 41 comes to an end. On the other hand, when the result of the decision at the step 52 is "NO" then the decision step 53 is executed. Namely, decision is made at this step 53 as to whether or not the program element $A_n$ is of the fixed type. When the decision at the step 53 results in "YES", the program element $A_n$ is outputted to the file at the step 54. On the contrary, when the decision step 53 results in "NO", the value of the slot "parent-relation" of the task-spec frame is inputted, whereon the program elements set in correspondence to the input value is determined to be the relevant program element $A_n$ of the variable type (i.e. $A_1$ or $A_4$) at the step 55. The processing of the step 54 is continued. Through these processings, the program for the successful finish decision function as desired is created in the auxiliary storage unit 3. This program includes the program elements $A_1$ to $A_5$ linked together in such a manner as shown in FIG. 18. It should however be noted that the variable type program element $A_1$ is now the program element CGC1 or CGC2 or CGC3. Further, the program element $A_4$ is now the program element CGC4 or CGC5 or CGC6.

In this way, there can be prepared the program for the successful finish decision function which reflects the inference control knowledges proper to the problem to be solved and included in the program creating knowledges. FIG. 25 shows an example of the successful finish decision function written in a C-language and created for the process planning problem shown in FIG. 14. This example of the program has been prepared through the processing at the step 141 by using the general-purpose program for the successful finish decision function shown in FIG. 18 (and in FIG. 19 in more concrete) and the program creating knowledges shown in FIG. 16.

Next, description will be turned to the step 142 of preparing the program for the failed finish decision function. The processing at the step 142 is performed through the substantially same procedure as the processing shown in FIG. 23 except for the difference in respect to the content of the processing at the step 49. More specifically, at this processing step 49, the number of the program elements is derived from the program element knowledges of the failed finish decision function, whereon the number is placed in the variable "n_ele". It should be noted that "An" at the step 53, 54 and 55 in FIG. 23 is replaced by "Bn". The program element knowledges of the failed finish decision function includes the knowledge of the frame "program element B1" and the knowledge indicating that the number of the program elements of the failed finish decision function is six. The knowledges of the frame "program element $B_1$" are same as those of the frame "program element $A_1$" mentioned hereinbefore. The program for the failed finish decision function is created by using the general-purpose program for the failed finish decision function (shown in FIG. 20) and the program creating knowledges (e.g. those shown in FIG. 16), as with the case of the program for the successful finish decision function. This program for the failed finish decision function can be prepared such that the inference control knowledges proper to the problem to be solved and included in the program creating knowledges can be reflected. The program for the failed finish decision function has program parameters $B_1$ to $B_6$ lined together in such a manner as illustrated in FIG. 20. It should however be noted that the variable type program element $B_1$ is a program element which has been selected from the frame "program element $B_1$" in correspondence to the value of the relevant slot.

Now, description will be made of the step 143 for preparing the program for the node select function. The processing at this step 143 is same as that shown in FIG. 23 except that "successful finish decision function" is replaced by "node select function" and that "$A_n$" at steps 53, 54 and 55 is replaced by "$C_n$", as in the case of the program for the failed finish decision function. The program element knowledges of the node select function prescribe the program elements which the variable type program elements should assume in correspondence to the values of the slots "parent-relation" and "sibling-relation" of the task-spec frame. At the step 143, the individual fixed type program elements included in the program for the node select function are stored in the auxiliary storage unit 3, as they are, by way of the decision step 53. On the other hand, the variable type program elements included in the program for the node select function are transformed to the program elements corresponding to the values of the slots "parent-relation" and "sibling-relation". These program elements are stored in the auxiliary storage unit 3. In this way, the program for the node select function having the linked program elements is created and prepared in the auxiliary storage unit 3. The program for the node select function is created in the manner similar to the program for the successful finish decision function by using a general-purpose program for the node selection and the inference control knowledges proper to the problem to be solved and included in the program creating knowledges (e.g. those shown in FIG. 16).

Finally, description will be directed to the creation of the program for the link select function which is executed at the step 144. The processing step 144 is same as that shown in FIG. 23 except that "successful finish decision function" at the step 49 is replaced by "link select function" and that "$A_n$" at the steps 53, 54 and 55 is replaced by "$D_n$".

FIG. 26 shows some of the program element knowledges of the link select function. The program element knowledges of the link select function include a knowledge which indicates that the number of the program elements of the link select function is ten. The knowledges of the frame "program element $D_{10}$" which are program element knowledges of the link select function serve to set the program elements SL1 to SL5 etc. which the program element $D_{10}$ should assume in dependence on the values of the slots "es-parent-relation" and "es-sibling-relation" of the task-spec frame. In other words, for the value a of the slot "es-parent-relation" correspondence of the program element (SL1, SL2, SL3, SL4 or SL5) is established for each of the values a to e of the slot "es-sibling-relation". Further, for the values b and c of the slot "es-parent-relation" correspondence of the program elements are established for each of the values a to e of the slot "es-sibling-relation".

The program elements $D_1$ to $D_9$ are stored in the auxiliary storage unit 3, as they are, through the decision step 53 included in the step 144. The program element $D_{10}$ becomes a program element which is determined by the values of the two slots mentioned hereinbefore through the processing at the steps 53 and 55 included in the step 144 and is stored in the auxiliary storage unit 3. The program for the link select function created in this manner contains the program elements $D_1$ to $D_{10}$ linked together in such a manner as shown in FIG. 21 and reflects the inference control knowledges proper to the object domain to which the problem to be solved belongs.

According to the instant embodiment, a problem solving program which reflects the inference control knowledges proper to a problem to be solved as well as the inference control knowledge proper to the object domain of the to-be-solved problem can automatically be prepared on the basis of the knowledges for creation of the program. Further, according to the instant embodiment, a problem solving program can be prepared for a given problem to be solved and a given object domain.

In particular, it should be mentioned that since the general-purpose search program is used as the basis for the creation of a problem solving program, creation of the program for solving a problem of concern can be much facilitated. Such extremely easy creation of a concerned problem solving program owes to the fact that the general-purpose search problem mentioned above comprises in addition to the program portion shown in the table 1 a fixed program portion which serves as a general-purpose program for the search elementary function "select-function" and variable type function programs serving as general-purpose programs for the successful finish decision function, the failed finish decision function, the node select function and the link select function, respectively. This can be explained by the fact that the variable type function programs constituting parts of the general-purpose search program can be made to be suitable for a specific problem and a particular object domain by applying one of the inference control knowledges proper to the problem to be solved and the inference control knowledges proper to the object domain of that problem, i.e. the predetermined inference control knowledges selected from the classified information for the problem solving strategies shown in FIGS. 2, 3, 11 and 12. Above all, the fact that the variable type function program includes the variable type program elements and the fixed type program element(s) further facilitates the preparation of a program for solving a problem of concern. The relevant variable type program elements are made fit or suitable to a particular problem of concern and a particular domain by applying predetermined inference control knowledges selected from the classified information for the problem solving strategy. By making the variable type program elements to be fit to a particular problem and a particular object domain, a general-purpose program containing as parts thereof the variable type program elements can be transformed extremely easily to a problem solving program capable of being applied to the particular problem and the particular object domain.

To say in another way, the use of the general-purpose program as the basis for a program to be prepared according to the instant embodiment is one of major or important factors for making available a tool for structurizing a knowledge processing system capable of preparing a relevant problem solving program for a given problem to be solved and a given object domain. In particular, the feature that the general-purpose search program mentioned above comprises the fixed type program and variable type function programs, and more specifically, the feature that the general-purpose search program includes the variable type program elements and the fixed type program elements presents one of the major or important factors which makes to be available the knowledge processing system structurizing tool capable of creating a relevant problem solving program according to the instant embodiment of the invention. It should however be mentioned that the most important factor which makes available the knowledge processing system structurizing tool capable of preparing a problem solving program as desired according to the instant embodiment of the invention is due to the application of predetermined information selected from the classified information of a predetermined problem solving strategy to the creation of the problem solving program.

Since the classified information are previously prepared for the predetermined problem solving strategies according to the teaching of the invention incarnated in the instant embodiment, the information required necessarily for preparing a problem solving program can be inputted without fail. Thus, the user can get rid of the burden of searching or determining newly the information required for the creation of the problem solving program.

Finally, referring to FIG. 27, description will be made of the concrete contents of the processing at the step 14, i.e. preparation of the knowledge base required for execution of the inference in accordance with the created problem solving program in the knowledge processing system.

Figure 27:
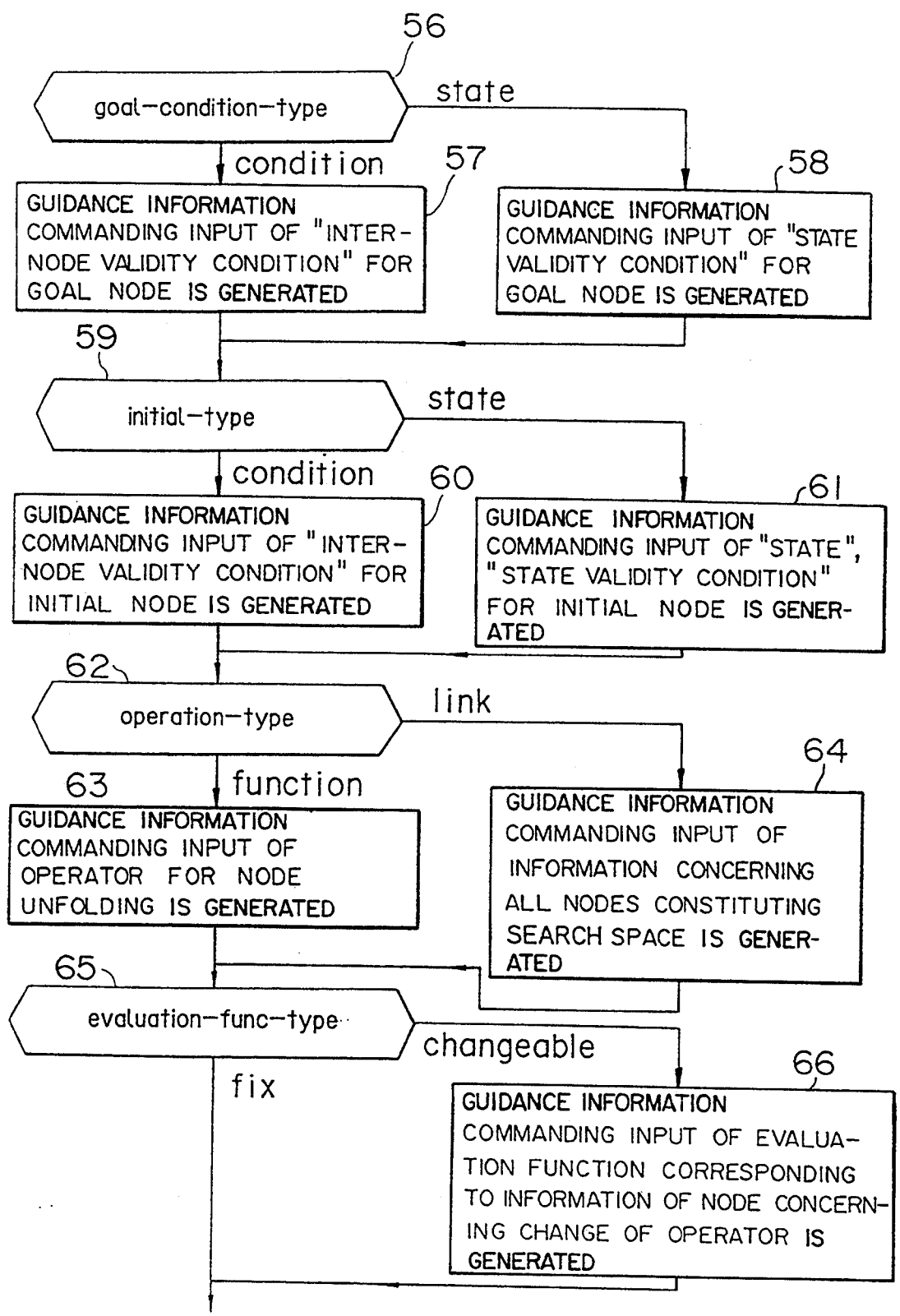
FIG. 27 is a view for illustrating in detail a processing procedure executed at a step 14 shown in FIG. 5.
Figure 28:
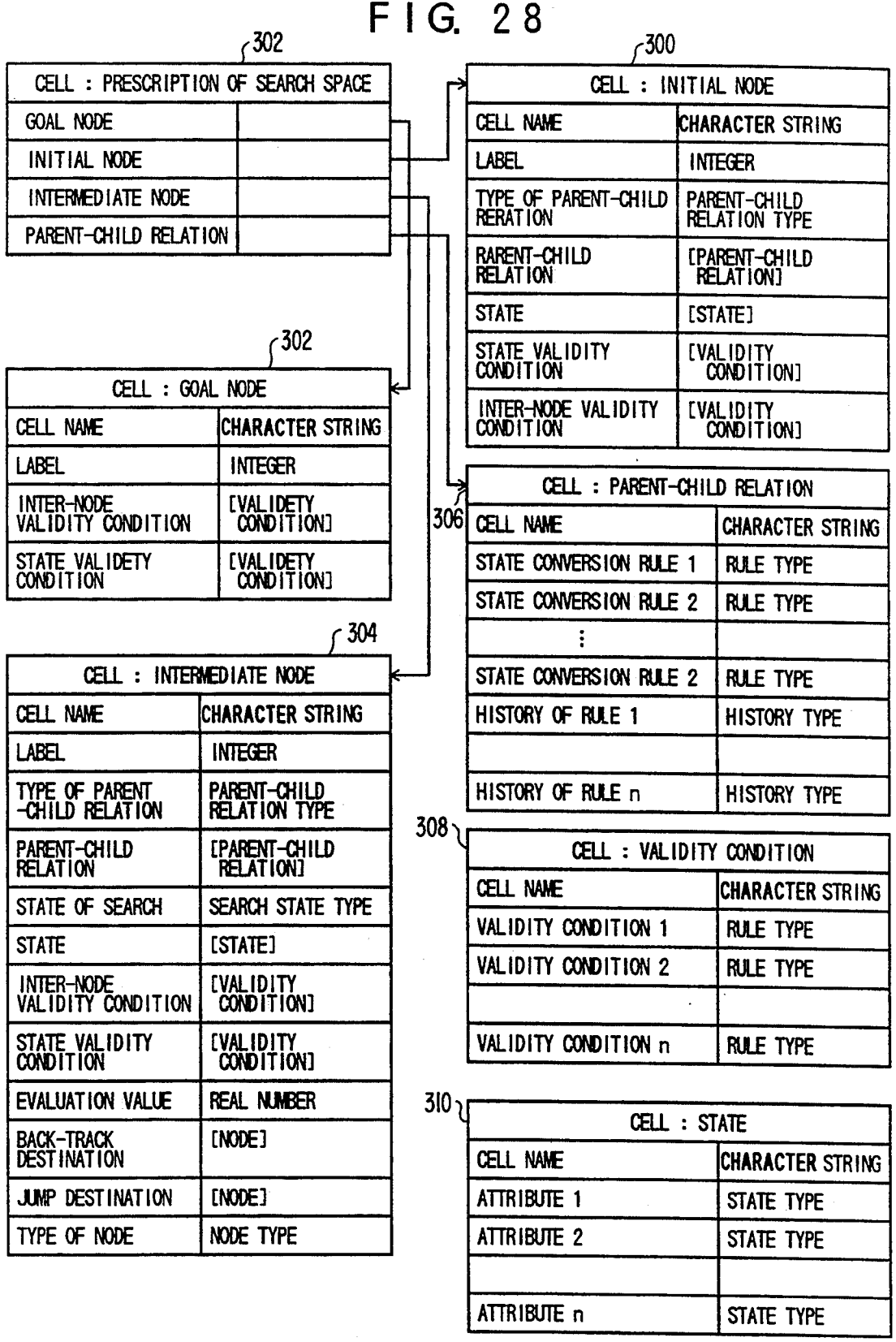
FIG. 28 is a view showing the contents of a knowledge base required for executing a prepared inference program.

FIG. 28 shows a knowledge base prepared through the processing illustrated in FIG. 27. More specifically, there are shown in FIG. 28 a data structure of the information constituting a search space for a problem to be solved and the object domain thereof. The information prescribing or defining the search space is represented by six types of cell structures including an initial node 300, a goal node 302, intermediate nodes 340, parent-child relations 306, validity conditions 308 and the states 310. Of these types of information, those concerning the initial node(s), goal node(s), intermediate nodes and the parent-child relations are each grouped in a cell referred to as the search space prescribing cell 312. Of the nodes constituting the search space, the nodes except the initial node and the goal node are each defined by a data structure referred to as the intermediate node cell 304. The initial node and the goal node are each defined by other data structures referred to as the initial node cell 300 and the goal node cell 302, respectively. Of the attributes of the individual nodes, the information representing the inter-node relation is referred to as the parent-child relation. The information of the parent-child relation is defined by the data structure of the parent-child relation cell 306. The attributes of the individual cells are referred to as the states, wherein the state information is defined by the data structure of the state cell. Further, the inter-node validity conditions and the state validity conditions are defined by special data structures referred to as the validity condition cell 308. In general, in the search problem, the individual nodes constituting the search space are either given previously or generated in the course of the search. In the former case, for each of the inter-node relations, the information of the relevant nodes is given as values of the attributes named "state conversion rule" contained in the parent-child cell 306. On the other hand, in the latter case, for the inter-node relations, the operators involved in the state conversion are given in terms of the values of the attributes named "state conversion rule" contained in the parent-child relation cell 306. By introducing the data structure referred to as the parent-child relation in this way, it is possible to describe more generally the search problem with identical data structures.

The information concerning the individual nodes constituting the search space is given to the relevant cells of the initial node cell 300, the intermediate node cell 304 and the goal node cell 302. Since the information for the initial, intermediate and goal nodes differs from one another in respect to the number, the preparation of the knowledge base can be much facilitated by supplying the information to the initial node cell 300, the intermediate node cell 304 and the goal node cell separately according to the instant embodiment of the invention rather than placing the whole information in a single node cell. Besides, because the information concerning the initial node, intermediate node and the goal node can be called from the respective node cells of the knowledge base within a short time, the time required for the inference can correspondingly be reduced.

The processing shown in FIG. 27 (corresponding to the step 14 shown in FIG. 5) includes steps 56 to 66. This processing is to guide the contents of relevant knowledges to be inputted to the display unit 1B while storing the input knowledges in the store means 9 at a predetermined area (FIG. 28) on the basis of the results of decisions made at the steps 56, 59, 62 and 65, respectively. The decisions at the steps 56, 59, 62 and 65 are each performed on the basis of the slot values of the task-spec frame.

At the step 56, decision is made for the value of the slot "goal-condition-type". When the value of concern is "state" processing of the step 58 is executed. On the other hand, in case the abovementioned value is "condition", processing of the step 57 is executed. At this step 57, guidance information commanding the inputting of the knowledge concerning "inter-node validity condition" for the goal node is generated. The user viewing the guidance generated on the display unit 1B then inputs the relevant knowledge concerning the object domain through the input unit 1A. The knowledges inputted are stored as the values of "inter-node validity condition" of the goal node cell 302 and the validity condition cell 308 corresponding to the goal node cell 302. At the step 58, guidance information commanding the inputting of the knowledge concerning "state validity condition" for the goal node is generated on the display. The knowledge inputted through the input unit 1A is stored as "state validity condition" of the goal node and the value of the relevant validity condition cell 308.

At the step 59, decision is made for the value of the slot "initial-type" When the value is "state", the processing step 61 is executed. If the value is "condition", the processing step 60 is executed At the step 60, guidance commanding the inputting of the knowledge concerning "inter-node validity condition" for the initial node. The knowledge inputted through the input unit 1A is stored in the initial node cell as "inter-node validity condition" and in other validity condition cell 308 corresponding to the initial node cell 300. At the step 61, there is generated on the display the guidance information which commands the inputting of the knowledges concerning "state validity condition" and "state" of the initial node. The knowledge inputted through the input unit 1A is stored in the initial node cell 300 as "state validity condition" as well as in the other validity condition cell 308 mentioned above and the state cell 310 corresponding to the initial node cell 300. In case there exists the information of the parent-child relation in association with the initial node, the information is inputted at the step 60 or 61 to be stored in the parent-child relation cell 306 which corresponds to the initial node cell 300.

At the step 62, decision is made as to the value of the slot "operation-type". When this value is "function" the processing at the step 63 is executed In case the value is "link" processing at the step 64 is executed. At the step 63, guidance commanding the inputting of the knowledge concerning the operator involved in the node unfolding is generated. The knowledge inputted through the input unit 1A is stored in the parent-child relation cell 306. At the step 64, guidance for commanding the inputting of the knowledges concerning all the nodes constituting the search space is generated. The knowledges inputted through the input unit 1A are stored in the intermediate node cell. In case the knowledges mentioned above include the knowledges concerning the parent-child relation, the validity condition and the state, the latter are stored in the relevant one of the parent-child relation cell 306, the validity condition cell 308 and the state cell 310 corresponding to the intermediate node cell 304. At the steps 63 and 64, the value of the slot "operation-type" is stored as the value of "parent-child relation type" for the intermediate cell 304 and the initial node cell 300.

At the step 65, decision is made for the value of the slot "evaluation-function type". When this value is "changeable", processing at the step 66 is executed. More specifically, at the step 66, guidance is generated for commanding-the inputting of node knowledge and an evaluation function concerning the change of the operator. On the basis of the corresponding information inputted through the input unit 1A, the relevant one(s) of search primitive functions and the search fundamental functions (1) to (21) stored in the store means 5 is changed or altered correspondingly. When the value of "evaluation-func-type" is decided to be "fix" at the step 65, none of the search primitive functions and the search fundamental functions (1) to (21) is changed.

The knowledges inputted at the step 14 as described above are related to the object domain of the problem to be solved. By virtue of such arrangement that the knowledges inputted at the step 14 are stored in the store means 9, there can be prepared the knowledge base required for executing the inference in accordance with the created problem solving program in the knowledge processing system.

Figure 29:
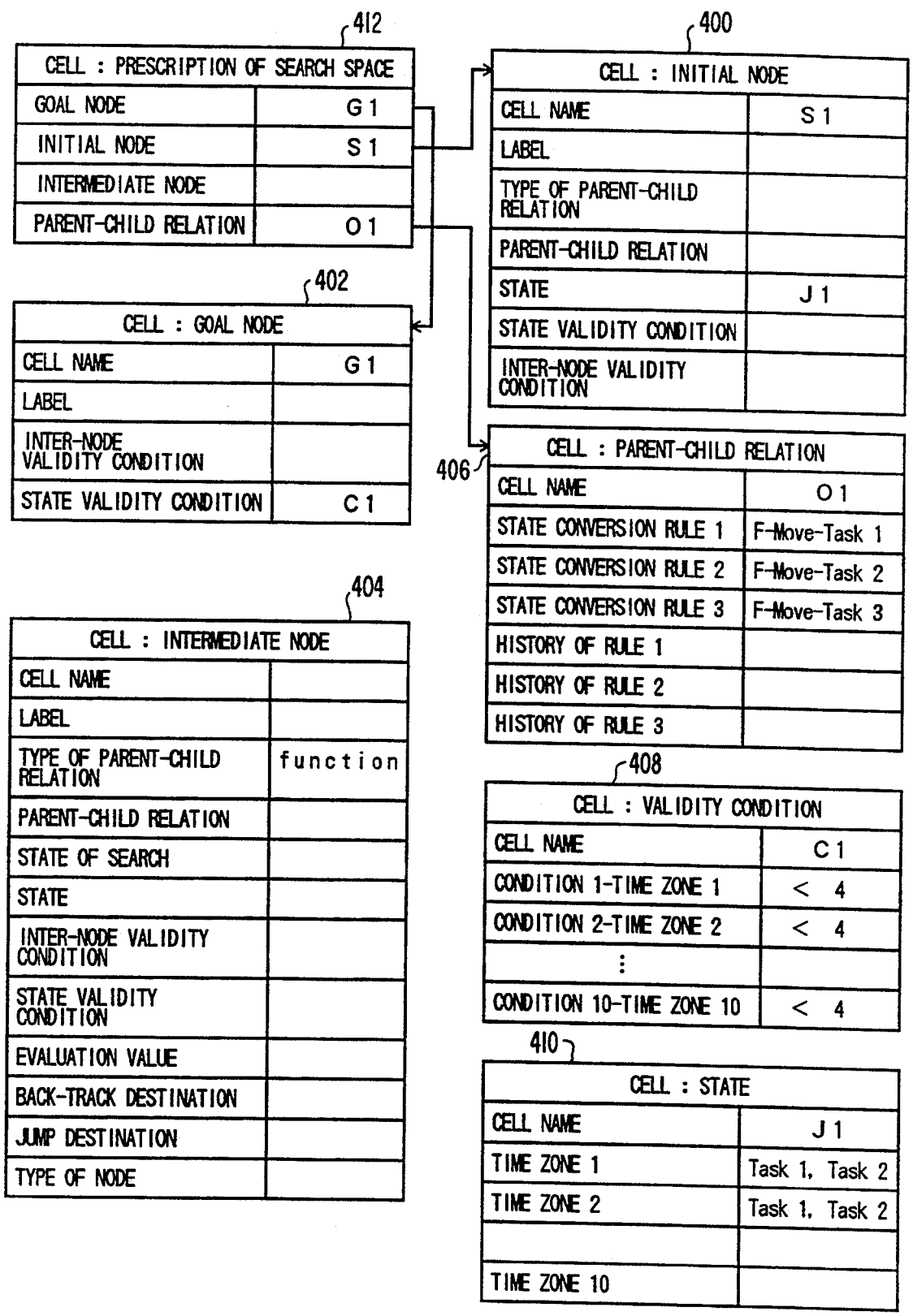
FIG. 29 is a view showing concrete example of the knowledge base applied to the problem shown in FIG. 14.

FIG. 29 shows, by way of example, a knowledge base which has been prepared for the process planning problem shown in FIG. 14 having cells 400-412. This knowledge base has been prepared in correspondence to the slot values of the task-spec frame shown in FIG. 16. FIGS. 30a and 30b show examples of the functions for the tasks of the state conversion rules for the parent-child relation cell 406 shown in FIG. 29. More specifically, there are defined the functions for delaying by one hour the start time of the tasks 2 and 3 which constitute the states as operators, respectively. These programs are described in a C-language by making use of an object-oriented programming procedure.

In the preparation of the knowledge base according to the instant embodiment described above, all the knowledges required for executing the inference in accordance with the created problem search program in the knowledge processing system can properly be inputted without omission because the inputting of the required knowledges is commanded by the guidance displayed on the basis of the predetermined information selected from the classified information of the predetermined problem solving strategy. Besides, preparation of the knowledge base can be much facilitated.

In the foregoing, description has been made of the exemplary embodiment of the invention in conjunction with structurization of the knowledge processing system for solving the process planning problem, only by way of example. Now, description will be directed to the structurization of a knowledge processing system for diagnosis of a nuclear reactor. In this conjunction, it will be appreciated that "diagnosis" is the problem to be solved, and "nuclear reactor" pertains to the object domain. Parenthetically, in conjunction with the process planning problem, it can readily be understood that "process planning" is the problem to be solved, and "tasks 1, 2 and 3" pertains to the object domain.

Now, structurization of the knowledge processing system for performing abnormality diagnosis of a nuclear reactor based on a hierarchical classification inference method will be described.

Figure 31:
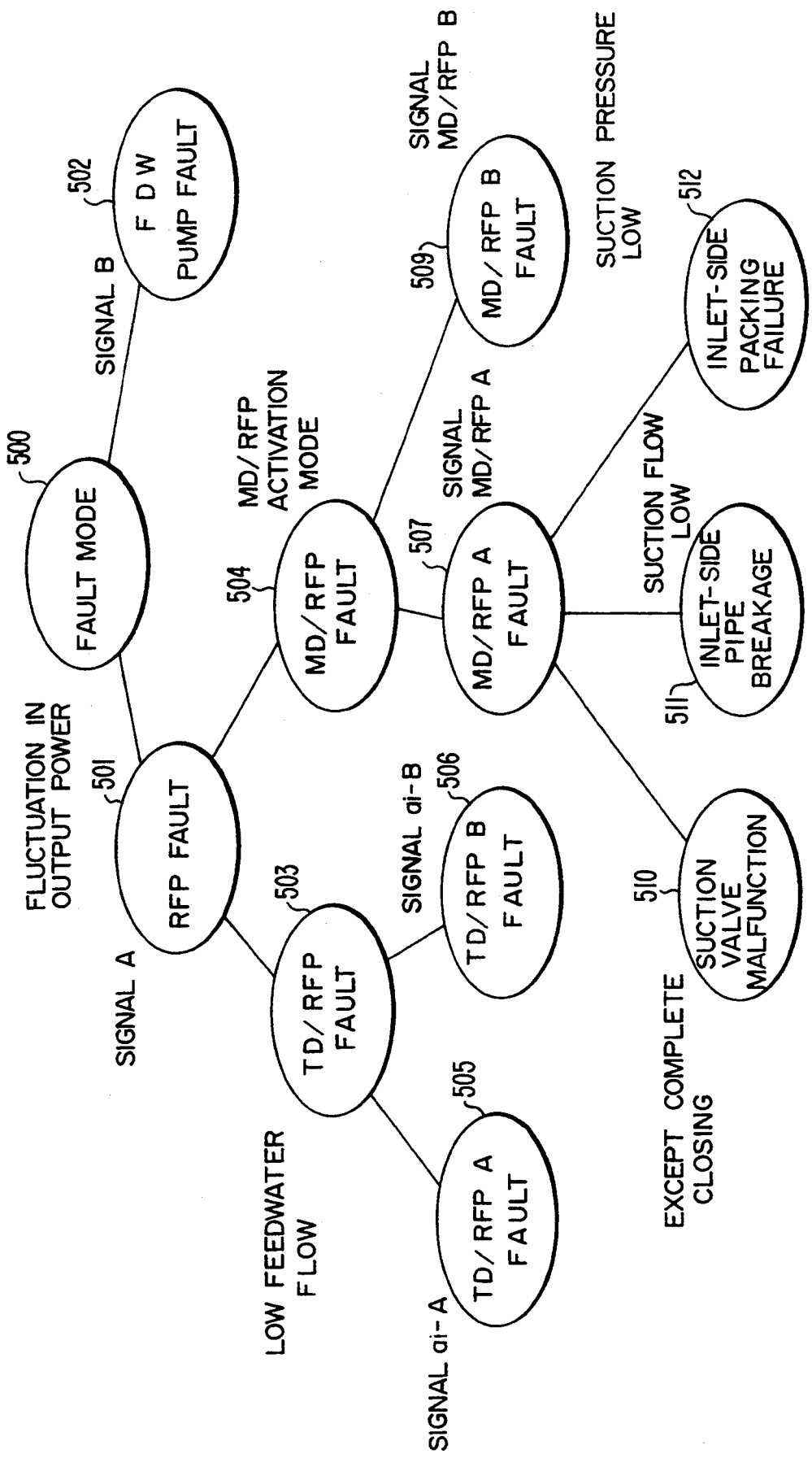
FIG. 31 is a view for illustrating the contents of hierarchical knowledges used for abnormality diagnosis of a nuclear reactor.

FIG. 31 shows knowledges required for performing the abnormality diagnosis in a nuclear reactor. In this figure, noun phrases shown in circles 500–512 represent the contents of the diagnosis decisions, while those noun phases outside the circles 500–512 indicate generated signals which provide the basis for the abnormality diagnoses. These signals are measured or detected in the nuclear power plant. In conjunction with the nomenclature adopted in FIG. 31, "RFP" represents a feedwater pump, "TD/RFP" denotes a turbine driving feedwater pump and "MD/RFP" denotes a motor-driven feedwater pump. The abnormality diagnosis starts from detection of a change in the output power of the nuclear reactor. Assuming, for example, that the signal A is generated, decision is made that fault or trouble occurs in the RFP (feedwater pump). Further, when generation of a signal indicating that flow level of the feedwater is low is detected, it is decided that some trouble occurs in the TD-RFP (turbine driving feedwater pump). The inference method which starts from a more general concept to derive a more detailed concept on the basis of the information available is referred to as a hierarchically classified inference method.

Figure 33:
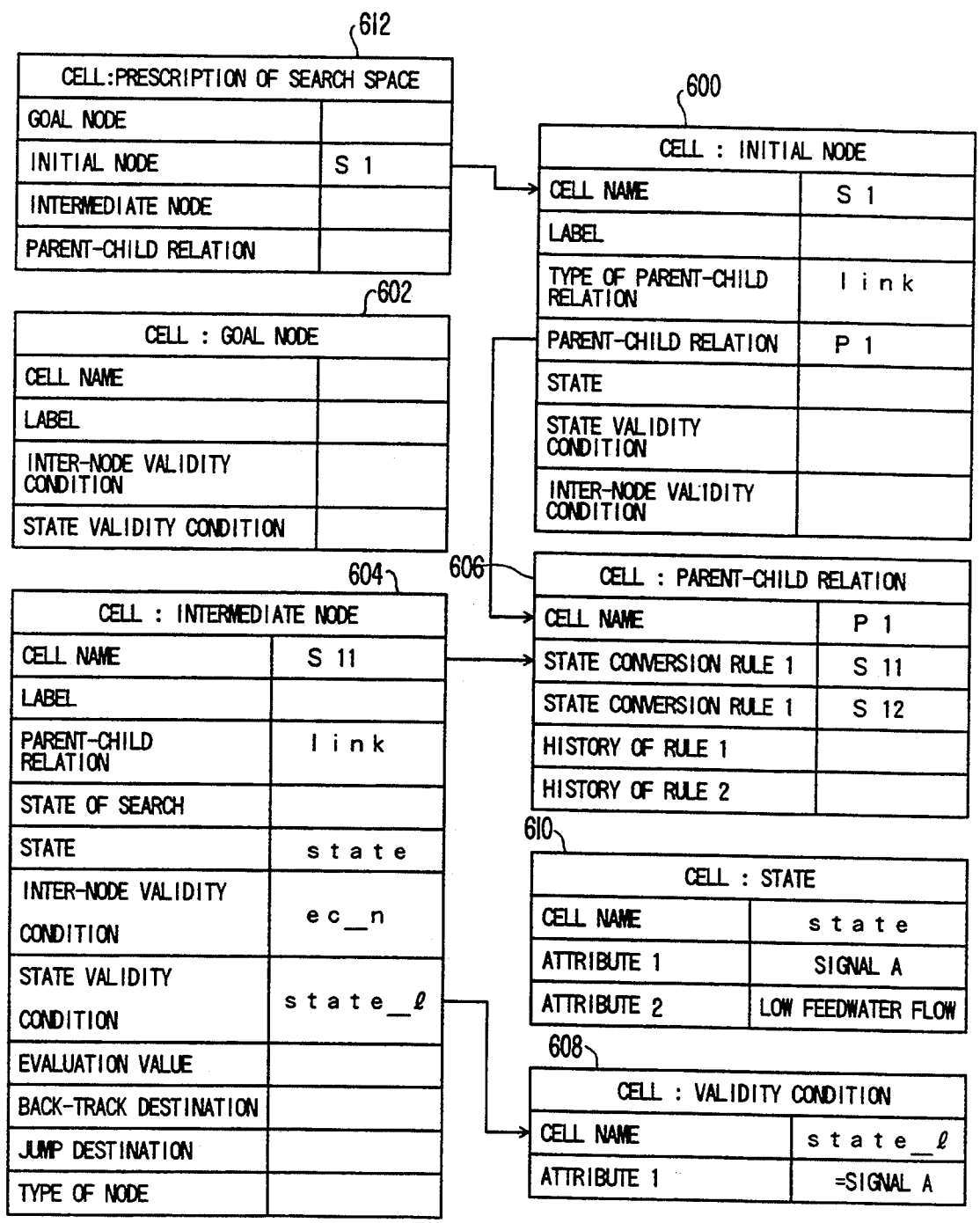
FIG. 33 is a view showing a concrete example of a knowledge base applied to the problem shown in FIG. 31.

A knowledge processing system for diagnosing the occurrence of abnormality in a nuclear reactor as mentioned above was structurized by using the knowledge processing system structurizing tool according to the embodiment of the invention described hereinbefore. FIG. 32 shows answers "A'" to "K'" to the strategically classified items inputted through the processing at the step 12. On the basis of these answers, the task-spec frame for the abnormality diagnosis of the nuclear reactor is prepared. Further, at the step 13, a problem solving program for the abnormality diagnosis of the nuclear reactor is created by using the information (knowledges) contained in the task-spec frame and the general-purpose search program mentioned hereinbefore. FIG. 34 shows a concrete example of the search elementary function "check-goal-cond 1" of the problem solving program created at the step 13. Further, FIG. 33 shows a typical example of the knowledge base having cells 600–612 for the abnormality diagnosis of the nuclear reactor prepared through the processing at the step 14 described hereinbefore. The knowledge base includes the knowledges required for making inference by using the problem solving program created for abnormality diagnosis of the nuclear reactor.

According to the instant embodiment, the problem solving program which is an inference program can automatically be created for a given problem to be solved and a given object domain, and the knowledge base which is required for executing the problem solving program can easily be prepared. Thus, for creation of a problem solving program of concern, it is sufficient for the user to select merely the information required for preparing the problem solving program, i.e. the information concerning the particular problem of concern and the particular object domain from the classified information of the problem solving strategy on the basis of the displayed menu.

Figure 35:
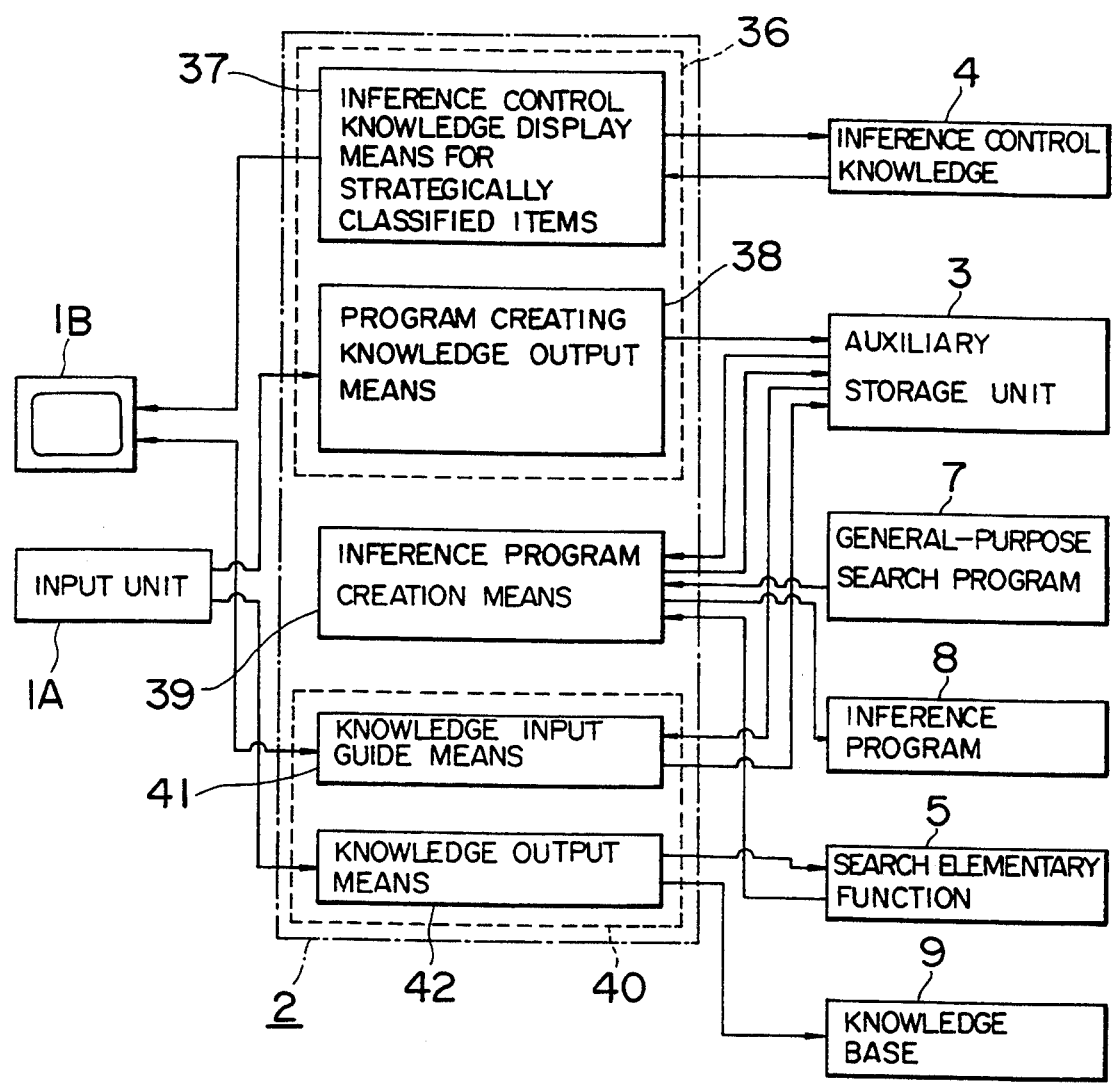
FIG. 35 is a view showing functions of an arithmetic processing unit for executing the processing procedure shown in FIG. 5.

Next, referring to FIG. 35, the function of the arithmetic processing unit (CPU) 2 for executing the processing procedure shown in FIG. 5 will be described. The arithmetic processing unit 2 includes a program-creation oriented knowledge base creating means 36, an inference program preparing means 39 and a knowledge base preparing means 40. The program-creation oriented knowledge base preparing means 36 is designed to execute the processing at the step 12 and includes to this end an inference control knowledge display means 37 and a program creating knowledge output means 38. The inference control knowledge display means 37 functionally corresponds to the steps 37, 33 and 34 shown in FIG. 6. The inference control knowledge display means 37 reads out for each of the strategically classified items the inference control knowledges included in the classified information for the problem solution from the store means 4 to output the knowledges to the display unit 1B. The program creating knowledge output means 38 performs the processings of the steps 28 to 32 and 38 shown in FIG. 6. More specifically, the program creating knowledge output means 38 outputs the information concerning the inference control knowledges designated by the user through the input unit 1A to a predetermined storage area of the auxiliary storage unit 3. The inference program creating means 39 generates an inference program by execution of the processing at step 13. There is provided a knowledge base preparing means 40. The knowledge base preparation means 40 serves to execute the processing at the step 14 and includes a knowledge input guide means 41 and a knowledge Output means 42. The knowledge input guide means 41 serves to execute the processing steps shown in FIG. 27. The knowledge output means 42 performs the processings at the steps 57, 58, 60, 61, 63, 64, and 66, although not shown in FIG. 27 and subsequently outputs the knowledge indicated at these steps to be stored at a predetermined area (FIG. 28) of the store means 9. The inputting of the knowledge is performed through the input unit 1A.

In the case of the embodiment described hereinbefore, the program creating knowledges of concern are obtained in an interactive manner by making use of the classified information of the problem solving strategy. It should however be understood that the desired information extracted from the classified information for the problem solving strategy may previously be so arranged as to be usable as the information prescribing the search space, whereon the information thus arranged may be displayed on the display unit 1B at one time, to the similar effects as in the case of the embodiment described above.

Further, although the input processing of the inference control knowledge contained in the classified information for the problem solving strategy is performed separately from the execution of an inference program creation processing, it should be appreciated that both processings can be executed as a single processing by preparing the search elementary functions of the corresponding problem solving program in accordance with the information prescribing the search space mentioned above. However, in that case, the information required for backing up the inputting of the knowledges of the object domain will have to be stored as the program preparing knowledges, as described hereinbefore.

It should further be mentioned that each of the programs mentioned in the forgoing may be prepared by using other programming language such as LISP, PROLOG, etc.

In the case of the embodiments described above, the storage unit 10 is combined with the arithmetic processing unit 2 in a set. In the following, another embodiment of the knowledge processing system structurizing tool according to the invention in which the storage unit 10 serving as the external memory is not employed and the function of the storage unit 10 is adapted to be performed by the auxiliary storage unit 3 which is an internal memory.

Figure 36:
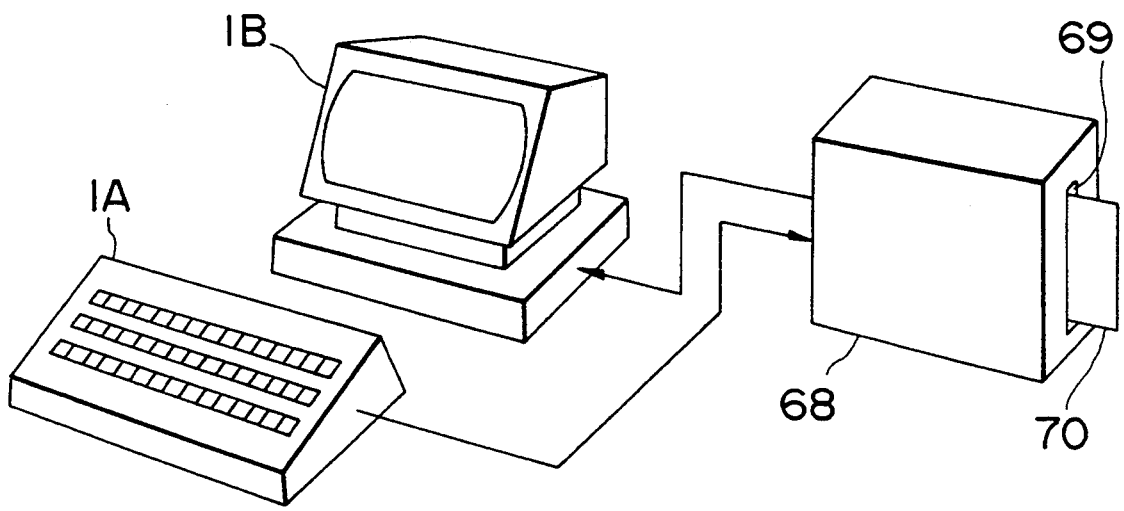
FIG. 36 is a view showing a structure of a knowledge processing system structurizing tool according to the invention.

In the case of the embodiment now under consideration, there is employed a computer such as a personal computer, work station or the like. The knowledge processing system structurizing tool according to the instant embodiment comprises an input unit 1A, a display unit 1B and a computer-based processing apparatus 68, as shown in FIG. 36. The computer-based processing apparatus 68 incorporates therein the arithmetic processing unit 2, the auxiliary storage unit 3, a floppy disk drive unit and an information read/write unit, although they are not shown. Further, the computer-based processing apparatus 68 is equipped with a floppy disk insertion slot for allowing insertion of a floppy disk 70 which is a transportable storage medium. The information read/write unit serves to read out the information written in the floppy disk placed in the floppy disk insertion slot 69 to load it in the auxiliary storage unit 3 and reversely to write the information stored in the auxiliary storage unit 3 in the floppy disk 70. Upon reading and writing of the information, the floppy disk drive unit drives rotationally the floppy disk 70 positioned within the floppy disk insertion slot 69. The floppy disk 70 includes four predetermined storage areas corresponding to those designated by reference numerals 4 to 7 in FIG. 1, respectively. These areas serve as the area for storing the classified information for the problem solving strategy including a plurality of inference control knowledges, the area for storing the processing procedure shown in FIG. 5 and the area for storing the general-purpose search program described hereinbefore in conjunction with the table 1 and FIGS. 18, 20, 21 and others.

When a knowledge processing system for solving a relevant problem by using the knowledge processing system structurizing tool according to the instant embodiment, the floppy disk 70 is first placed in the floppy disk insertion slot 67 to thereby allow the information stored in the storage areas of the floppy disk 70 to be loaded in the auxiliary storage unit 3. The arithmetic processing unit 2 fetches the processing procedure shown in FIG. 5 from the auxiliary storage unit 3 to perform the processing based on the procedure. The information (or knowledges) obtained through the processing is stored in the auxiliary storage unit 3. The inference program as created is stored in the auxiliary storage unit 3. The knowledge base required for executing this inference program is prepared in the auxiliary storage unit 3. This embodiment can assure same advantageous effects as those of the embodiment shown in FIG. 1.

The computer such as a personal computer or work station used as the knowledge processing system structurizing tool according to the instant embodiment can be used intact as the knowledge processing system with the prepared inference program and knowledge base being incorporated as they are. When other computer is used as the knowledge processing system, the floppy disk 70 having stored therein the predetermined information described above is taken out from the floppy disk inserting slot 69. Then, another floppy disk is inserted in the slot 69, whereon the created inference program and the knowledge required for executing the inference program stored in the auxiliary storage unit 3 are written in the floppy disk. The information thus recorded on the floppy disk may be written in the computer which is to be used as the knowledge processing system.

In the case of the exemplary embodiments of the invention described above, the individual search elementary functions of the general-purpose search program are constituted by establishing correspondences between the classified information of the problem solving strategy and the search fundamental functions having the built-in search primitive functions by resorting to the correspondence table.

Next, description will be made in detail of a second exemplary embodiment of the present invention in which correspondences between the individual search elementary functions in the general-purpose search program and the search fundamental functions which constitute the elementary functions on one hand and the correspondences between the individual search fundamental functions and the search primitive functions constituting the search fundamental functions on the other hand are held separately from each other, wherein the individual search elementary functions of the general-purpose search program are selectively realized by using the classified information for the problem solving strategy.

Before entering into description in concrete, the individual search elementary function, the search primitive function and the search fundamental function held previously by the system will be explained. With the elementary function of the general-purpose search program, it is intended to mean the functions which constitute the major parts of the general-purpose search program shown in the table 1 and which include the successful finish decision function, failed finish decision function, node select function, link select function, operator selection/application function and the active node update function. These search elementary functions correspond to "check-goal-cond 1", "check-goal-cond 2", "select-node", "select-link" "select-function" and "reset-active-node" respectively. In each of these search elementary functions, the activity of the function prescribed by the input/output items is independent of the method of solving the problem of concern. However, the processing contents of the individual functions are determined by the concerned problem domain and the method of solving the problem.

The content of the processing can be determined by introducing the search fundamental functions which determine the contents of the processing in dependence on the difference in the concerned problem domain and the problem solving method and by selecting the search fundamental functions on the basis of the difference among the problem solving programs. Further, the search fundamental functions are those shown in FIG. 4 at the lower section and serve for extracting the information required for controlling the search from the individual information constituting the search tree. The activities of these functions are independent of the method of solving the concerned problem. However, the contents of processings of these functions are determined in dependence on the methods of solving the concerned problems. Besides, the search fundamental function can be constituted by a function defining the search space proper to the concerned or object domain (e.g. an evaluation function in a planning problem) and the search primitive function which is independent of the concerned domain in consideration of the concerned or object domain and the problem solving method. The search primitive functions are those shown in FIG. 4 at the upper section and serve for prescribing fundamental manipulations or operations concerning the search tree. In other words, any complex manipulation or operation of the search tree can be realized by combining these primitive functions. However, the manipulation or operation which depends on the object domain is excluded.

As will be appreciated from the above, the problem solving program of any type can be created through the processing for determining the search fundamental function composed of a combination of the search primitive function and the function proper to the domain from the information which depends on the object domain and the problem solving method and through the processing for determining the search elementary function composed of a combination of the search fundamental functions from the information which depend on the problem solving method. Thus, according to the teachings of the invention incarnated in this second embodiment, the processings mentioned above are carried out by creating the executable search elementary functions and the search fundamental functions by preparing skeletons of the search elementary functions and the search fundamental functions of the general-purpose search program as well as the executable search primitive function while making use of the problem solving strategy inputted by the user.

Because of adoption of the method mentioned above, the instant embodiment differs from the first embodiment of the invention in respect to the processing procedure (step. 13 shown in FIG. 5). Incidentally, in the following description of the processing steps, it is assumed, by way of example only, that the problem of concern is the process planning problem described hereinbefore in conjunction with the first exemplary embodiment of the invention.

Figure 37:
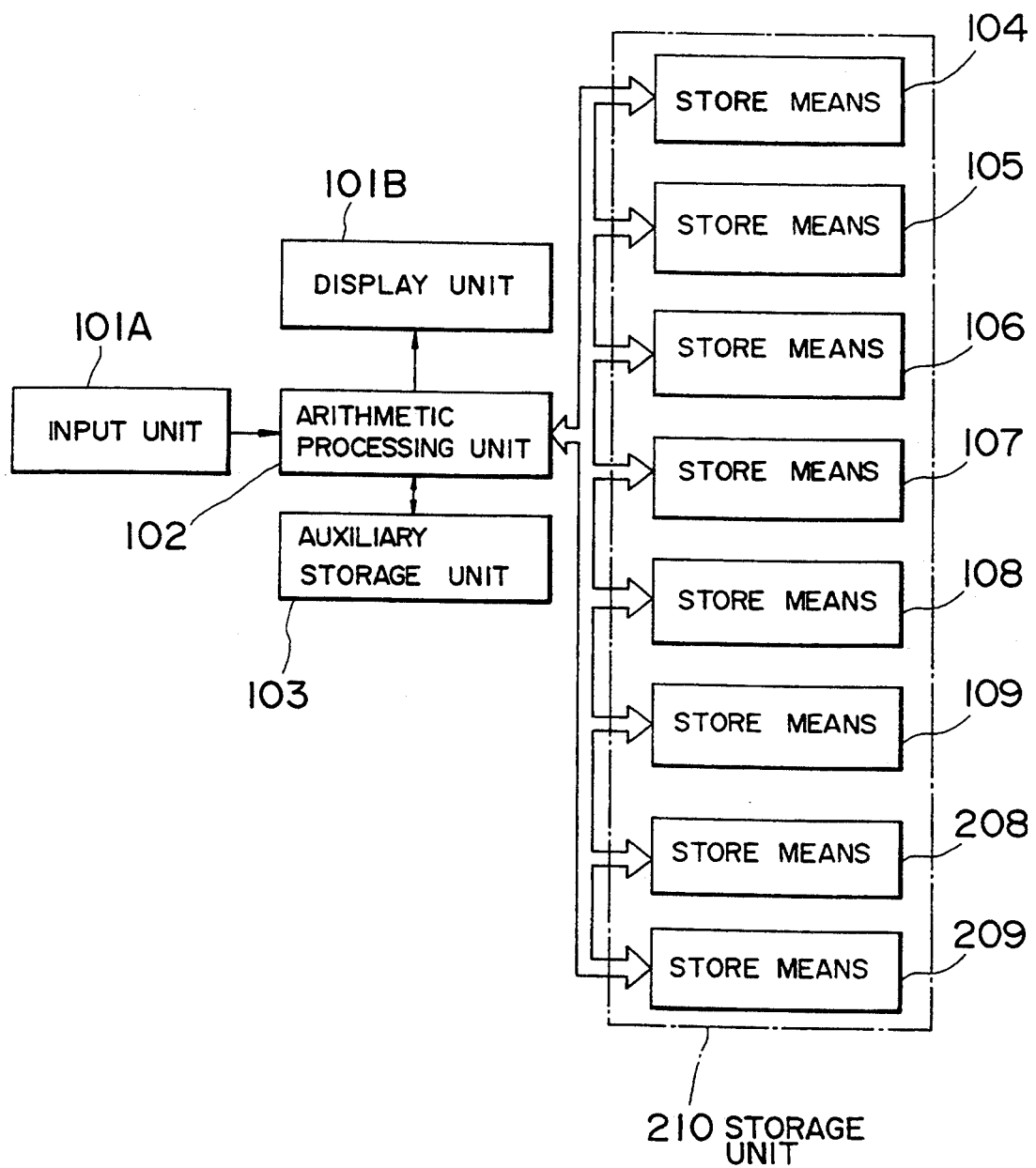
FIG. 37 is a schematic block diagram showing a general arrangement of a knowledge processing system according to a second embodiment of the present invention.

FIG. 37 shows a system structure according to the instant embodiment. Referring to the figure, the knowledge processing system structurizing tool comprises an input unit 101A, a display unit 101B such as a CRT display, an arithmetic processing unit (CPU) 102, an auxiliary storage unit 103 constituted by an internal memory and a storage unit 210 constituted by an external memory. The input unit 101A, the display unit 101B, the auxiliary storage unit 103 and the storage unit 210 are connected to the arithmetic processing unit (CPU) 102. The storage area of the storage unit 210 is divided into at least eight areas which function as the store means 104 to 109, 208 and 209, respectively. The store means 104 serves to store the classified information for the problem solving strategy illustrated in FIGS. 2 and 3. The store means 105 serves to store a group of functions including the search primitive functions (1) to (12) and the search primitive functions (13) to (21), as shown in FIG. 4. The store means 106 serves to store the processing procedure according to the instant embodiment illustrated in FIG. 38. The store means 107 serves to store the general-purpose search program shown in the table 1 mentioned hereinbefore in conjunction with the first embodiment of the invention and a skeleton of six search elementary functions constituting the program. The store means 108 serves to store a problem solving program created according to the teaching of the invention incarnated in the instant embodiment. The store means 109 stores therein the knowledges required for executing the problem solving program created according to the instant embodiment in the knowledge processing system. The store means 208 stores a correspondence table listing the correspondences established between the search primitive functions and the search fundamental functions stored in the store means 105 for the individual items of classified information of the problem solving strategy stored in the store means 104. The store means 209 stores therein a correspondence table listing correspondences established between the search fundamental functions stored in the store means 105 and the individual search elementary function constituting the general-purpose search program stored in the store means 107 for the individual items of the classified information of the problem solving strategy stored in the store means 104. The arithmetic processing unit (CPU) 102 responds to the inputting of a start signal to the input unit 101A by the user to thereby read out the processing procedure shown in FIG. 38 from the store means 106 for executing predetermined processings in accordance with the processing procedure. The contents of the processing executed by the arithmetic processing unit 102 will be described below in detail.

At first, at a step 112, information how to solve a problem to be solved is inputted in accordance with the individual strategically classified items of the classified information for the problem solving strategy. The information as inputted is stored in a predetermined storage area of the auxiliary storage unit 103. The knowledge base of a frame structure will hereinafter be referred to as the knowledge base for program preparation or the program creation knowledge base, as in the case of the first embodiment. At a step 113, a problem solving program is created by using a predetermined general-purpose search program and the program creation knowledge base. At a step 114, processing for inputting the knowledges (object knowledges) required for executing the created problem solving program in the knowledge processing system to thereby prepare the knowledge base is executed. With the aid of the created problem solving program and the object knowledge, the knowledge processing system for solving the problem imposed can be implemented. In other words, the knowledge processing system for solving the problem and the knowledge base containing the object knowledges.

In the following, description will be made in detail of the individual processings.

Figure 38:
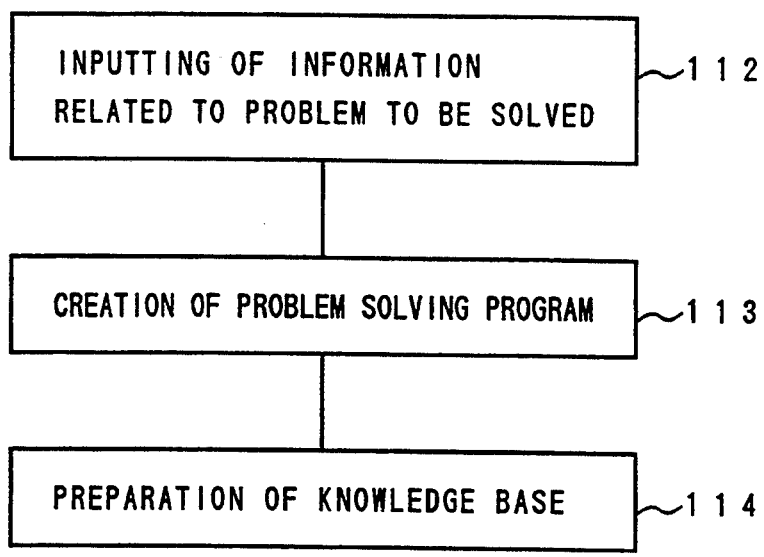
FIG. 38 is a flow chart showing in general a processing procedure according to the second embodiment.

The processing at the step 112 shown in FIG. 38 is substantially same as the processing 12 of FIG. 5 in the first embodiment. Consequently, when the process planning problem described in conjunction with the first embodiment is the problem to be coped with, the answers to the classified information for the problem solving strategy inputted by the user are same as those shown in FIG. 16 for the first embodiment of the invention.

Next, description will be turned to the processing at the step 113. At the step 113, the problem solving program for the knowledge processing system is created. The problem solving program according to the instant embodiment is constituted as the search program, as described hereinbefore in conjunction with the first embodiment. In the case of the instant embodiment, there are provided as the skeleton of the search program the general-purpose search program shown in the table 1 stored in the store means 107 and the six search elementary functions constituting that program. The general-purpose search program is a program represented in rule forms by using an object oriented programming procedure, as in the case of the first embodiment. Thus, this program can be transformed to an executable program by inserting concrete processing statements in determinative portions of the skeleton comprising the six search elementary functions given as the method of a frame "control" (hereinafter referred to as the control frame as in the case of the first embodiment). Each of the statements to be inserted is correlated or linked to the information required for solving the problem through the search primitive function and the search fundamental function. As the result, the problem solving program suited for solving the problem of concern can be obtained simply by giving the information required for solving the problem of concern.

Figure 39:
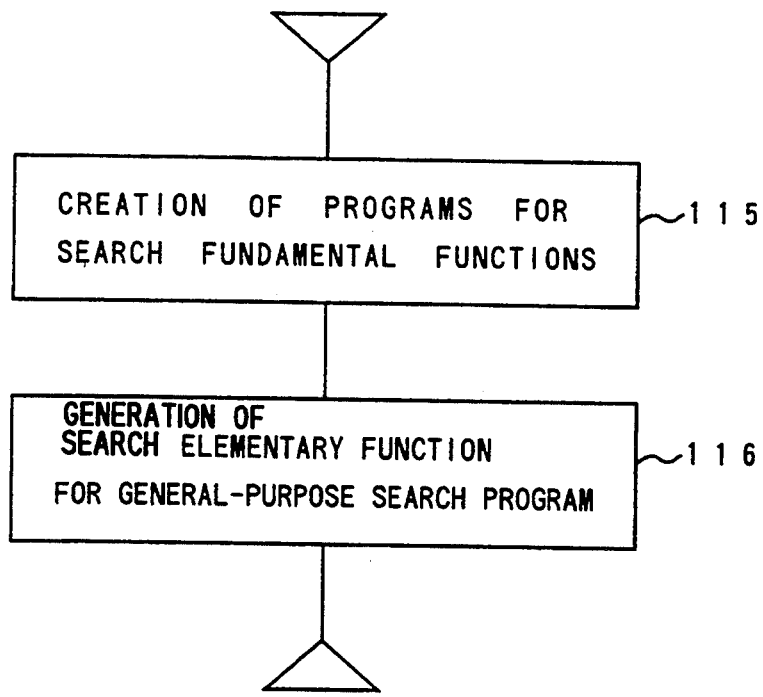
FIG. 39 is a flow chart for illustrating the processing step 113 shown in FIG. 38.

FIG. 39 illustrates the content of the processing 113 shown in FIG. 38. Referring to FIG. 39, at the step 115, there are read out the program creation knowledges from the auxiliary storage unit 103, the correspondence table (hereinafter referred to as the correspondence table 1) listing the correspondences established between the search primitive functions and the search fundamental functions through the medium of the program creation knowledge from the store means 208 and the skeleton of the search fundamental functions stored in the store means 105, whereon an executable program for the search fundamental functions to be used in the problem solving program is created. The executable search fundamental function program thus created is stored in the store means 108 as a part of the ultimate problem solving program. In that case, the individual search primitive functions stored in the store means 105 are also transferred to the store means 108.

Next, at the processing step 116, there are read out the program creation knowledges stored in the auxiliary storage unit 103, the correspondence table (hereinafter referred to as the correspondence table 2) listing correspondences established between the search fundamental functions and the search elementary functions through the medium of the program creation knowledges and stored in the store means 209, and the skeleton of the search elementary functions stored in the store means 107, whereon the executable search elementary function program to be used in the problem solving program is created by reference to the individual items of the program creation knowledges. The executable search elementary function program thus created is stored in the store means 108 as a part of the ultimate problem solving program. At that time, the general-purpose program stored in the store means 107 is also transferred to the store means 108. At this juncture, it should be mentioned that although the executable programs as created through the processing mentioned above are stored in new store means, they can equally be stored in the store means 105 or 107 which stores the general-purpose program, the search fundamental functions and the search primitive functions.

Figure 40:
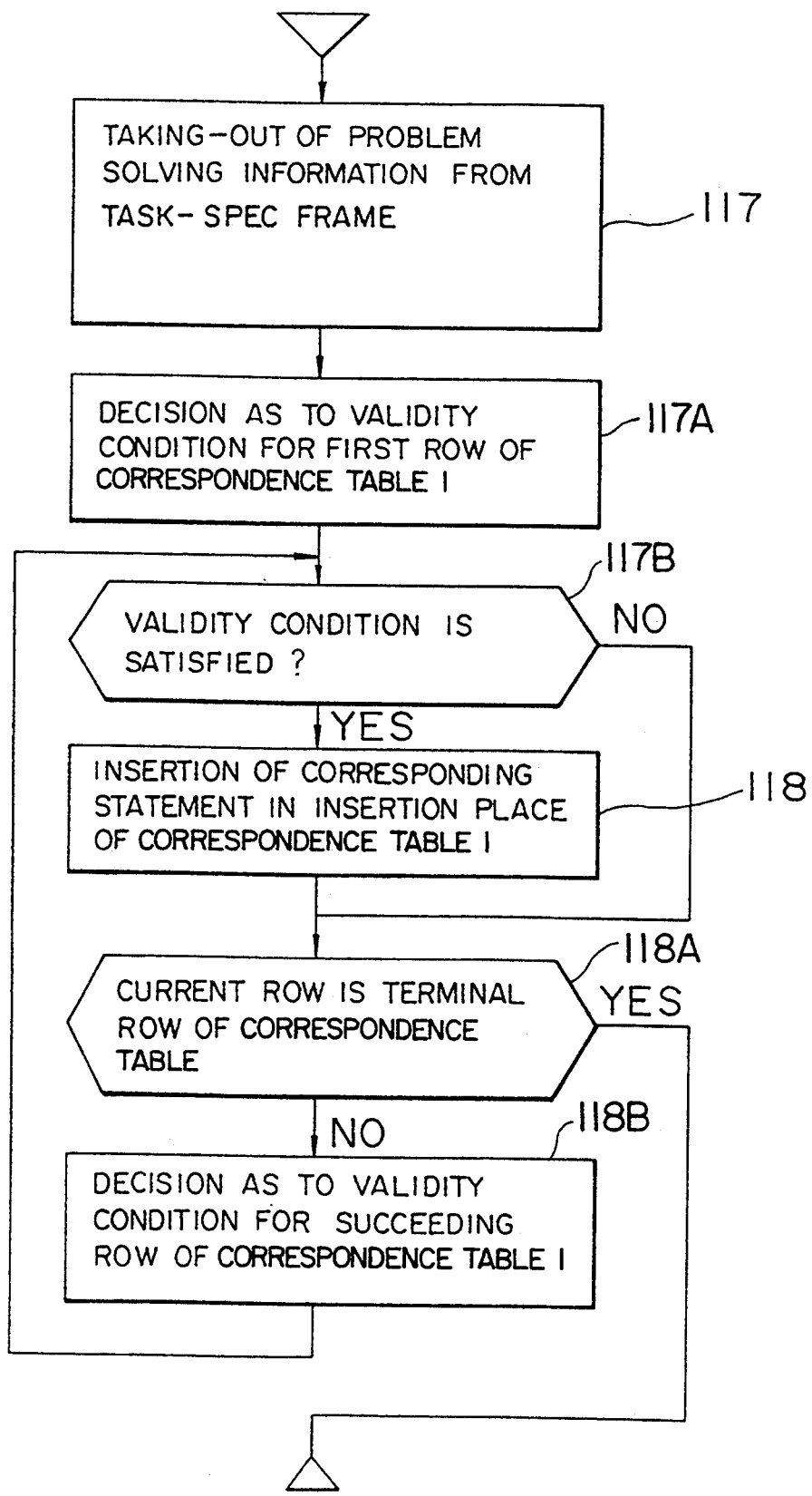
FIG. 40 is a flow chart for illustrating in detail a processing step 115 shown in FIG. 39.

Now, the processings 115 and 116 will be described in detail by taking as example the process planning problem discussed hereinbefore in conjunction with the first embodiment of the invention. FIG. 40 illustrates in detail the processing steps for the processing 115. Further, FIG. 41 shows an example of the skeleton of the search fundamental functions employed in the instant processings and FIG. 41 shows a part of the correspondence table 1. As can be seen in FIG. 41, the skeleton comprises an outline program and an insertion program. The program creation knowledges as employed may be the same as those shown in FIG. 16.

By way of example, generation of a function "EVALUATE (C,K)" which is one of the search fundamental functions and which returns a node evaluation function in the search process will be described. In the correspondence table 1 shown in FIG. 42, there are contained corresponding statements to be inserted and the places for the insertion on the basis of the results of selection of the classified items of the problem solving strategy. The individual items A, B, C, ... of the problem solving strategy correspond to those shown in FIG. 9. As described hereinbefore, the correspondence table 1 contains the correspondences established between the search fundamental functions and the search primitive functions through the medium of the classified information items of the problem solving strategy. For establishing the correspondence, there are used the inference control knowledges for the classified items of the problem solving strategy which depend on the problem solution together with the inference control knowledges proper to the object domain. The place for insertion indicates the location designated as insertion position in FIG. 41. In the case of the example under consideration, the processing program shown in FIG. 40 first reads out the problem solving strategy designated in the table (processing step 117). Since I=a and J=a in the case of the instant example (step 117A), the conditions at the first row of the table is satisfied, (step 117B) whereby a corresponding statement "deep" is taken out from the correspondence table and the search primitive function is inserted in the insertion program T3 (processing step 118). When the functions have been inserted in the insertion program, the latter is inserted in the outline program at the position E1 which serves as a tag of the insertion program. The processing program makes decision as to whether or not the final end of the table has been attained (step 118A). If so, execution of the processing program comes to an end. Otherwise, similar processing is performed for the succeeding row (step 118B).

In the case of the instant embodiment, the evaluation function in FIG. 43 is generated. In this figure, the function "user-eval" is inputted as the knowledge of the object domain by the user at the processing step 114 shown in FIG. 38, as described hereinafter.

Through the processings described above, all the search fundamental functions shown in FIG. 4 are constituted by the search primitive functions, whereby the executable program is realized.

Figure 44:
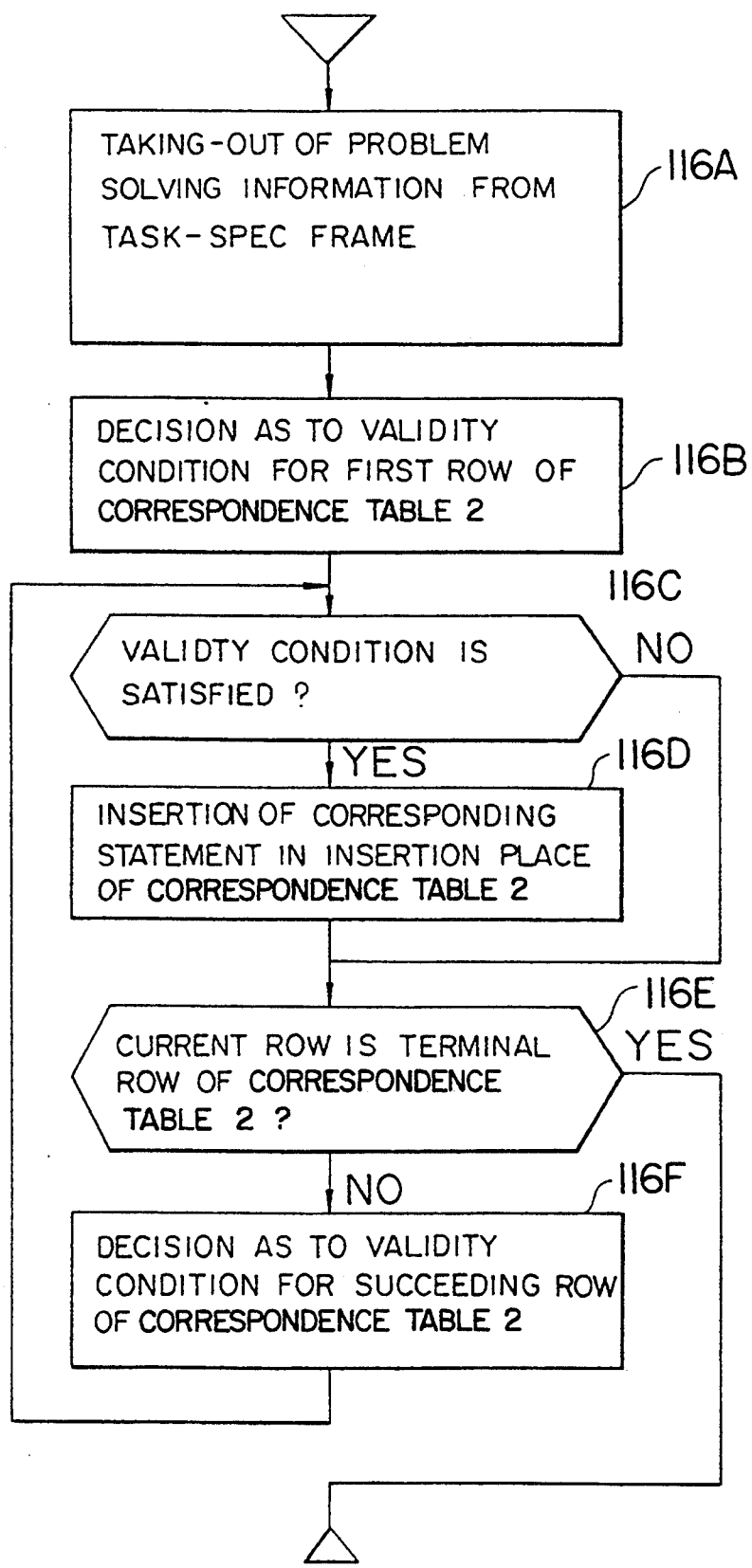
FIG. 44 is a flow chart for illustrating in detail the processing performed at a step 116 shown in FIG. 39.

FIG. 44 is to illustrate in detail the processing 116 which includes processing steps 116A–F of a processing program for generation of the elementary functions of the general-purpose search program. The following description is directed, by way of example, to the generation of an active node update function "reset_active_node" which is one of the search elementary functions. FIG. 45 shows an example of the skeleton of the active node update function "reset_active_node" employed in this processing. The skeleton is of a structure similar to that of the search fundamental function. FIG. 46 shows a portion of the correspondence table 2. The contents of the processing are similar to those of the processing resorted to for generating the search fundamental function. However, the classified items J and K which are the inference control knowledges proper to the object domain are not used in the corresoindence table, as shown in FIG. 46. By using these data, the validating condition is searched starting from the first row in FIG. 46 with the active node update function. In the case of this example, "MAKE_LINK" is selected because C=1. As a result, "MAKE_LINK" is fit in a location T1 of the insertion program. Since the tag of this insertion program is R1, the program is inserted in the outline program at the position R1. Similarly, "deep" is inserted in the outline program at the position R2. In this manner, the active node update function shown in FIG. 47 is ultimately generated. This function serves to eliminate the nodes from the active nodes when the operators are no more present.

Through the processings described above, all the search elementary functions are realized by the search fundamental functions, whereby the executable program is realized.

Finally, preparation of the knowledge base required for executing the inference in accordance with the created problem solving program in the knowledge processing system is carried out at the processing step 114. The content of the processing 114 of the instant embodiment are utterly same as that of the first embodiment. In other words, the processing succeeding to that shown in FIG. 27 for the first embodiment is performed.

According to a feature of the present invention, an inference program can be created for a given problem to be solved and a given object domain.

According to another feature of the present invention, the information required for creating or generating the inference program can be inputted in a much facilitated manner.

According to a further feature of the invention, creation of the inference program can be much facilitated.

According to still another feature of the invention, the knowledge base necessary for executing the created inference program can be prepared extremely easily.

We claim:

1. An assistant tool for assisting creation of an inference program in a knowledge processing system, comprising:
   input means for inputting information related to a problem desired to be solved, in accordance with selection menus for permitting a user to select classified items of a predetermined search control strategy, said items determining an initial node, a goal node and developments of intermediate nodes of a general-purpose search program;
   fist storage means for storing the input information inputted through said input means to be used in creating an inference program;
   second storage means for storing a skeleton of said general-purpose search program and skeletons to search elementary functions which are to be included in said skeleton of said general-purpose search program;
   third storage means for storing search functions which are to be included in said skeletons of said search elementary functions;
   fourth storage means for storing a correspondence table in which correspondences are preliminarily established between said skeletons of said search elementary functions and said search functions based on said items of said search control strategy;
   fifth storage means for storing a procedure for creating an inference program by utilizing said skeleton of said general-purpose search program; and
   means, connected to said input means and said first, second, third, fourth and fifth storage means, for creating an inference program for solving the desired problem based on said skeleton of said general-purpose search program;
   wherein said input means or relating said inference program includes:
   means for completing said skeletons of said search, elementary functions by selecting required search functions from said third storage means in accordance with said procedure stored in said fifth storage means while referring to said correspondence table stored in said fourth storage table means, and
   means for completing said skeleton of said general-purpose search program to create said inference program by using said completed skeletons of said search elementary functions.

2. An assistant tool according to claim 1, wherein said search functions include search primitive functions and search fundamental functions.

3. An assistant tool according to claim 2, wherein said search functions in said correspondence table are filled with said search primitive functions.

4. An assistant tool according to claim 2, wherein correspondence table comprises:
   a first correspondence table containing correspondences established between said search fundamental functions and said search primitive functions by said input information, and
   a second correspondence table containing correspondences between said search fundamental functions and said skeletons of said search elementary functions.

5. An assistant tool according to claim 4, wherein said first correspondence table is prepared in consideration of knowledge information related to a domain to which the desired problem to be solved pertains.

6. An assistant tool according to claim 1, further comprising:

display means for displaying guide messages in accordance with the classified items of the search control strategy, wherein the user inputs said input information through said input means in response to said guide messages.

7. A method of assisting creation of an inference program in a knowledge processing system, comprising the steps of:

displaying on display means guide messages to guide a user to input information in accordance with classified items of a predetermined search control strategy, said items determining an initial node, a goal node and developments of intermediate nodes of a general-purpose search program;

inputting by input means input information related to a problem desired to be solved through said input means in response to said guide messages;

storing said input information in storage means for use in creating an inference program;

consulting a corresponding table stored in said storage means, said corresponding table containing correspondences preliminarily established between skeletons of search elementary functions and search functions by said input information;

completing said skeletons of said search elementary functions by selecting required search functions from said storage means; and preparing a desired inference program by completing a skeleton of a general-purpose search program by using said completed skeletons of said search elementary functions.

8. An assistant tool for assisting creation of an inference program in a knowledge processing system, comprising:

storage means for storing a plurality of predetermined inference control items of a search control strategy; and means for creating an inference program for solving a desired problem on the basis of inference control items related to said problem which are selected from said plurality of predetermined inference control items, wherein said storage means stores said plurality of predetermined inference control items of said search control strategy interlined in the form of a tree structure.

* * * * *